(12) United States Patent
Graf et al.

(10) Patent No.: US 9,792,268 B2
(45) Date of Patent: Oct. 17, 2017

(54) ZOOMABLE WEB-BASED WALL WITH NATURAL USER INTERFACE

(71) Applicant: SAP SE, Walldorf (DE)

(72) Inventors: Hans-Michael Graf, Stuttgart (DE); Ulf Brackmann, Bruehl (DE)

(73) Assignee: SAP SE, Walldorf (DE)

( * ) Notice: Subject to any disclaimer, the term of this patent is extended or adjusted under 35 U.S.C. 154(b) by 123 days.

(21) Appl. No.: 14/713,951

(22) Filed: May 15, 2015

(65) Prior Publication Data

US 2016/0335740 A1 Nov. 17, 2016

(51) Int. Cl.
| | |
|---|---|
| *G06F 17/22* | (2006.01) |
| *G06F 17/21* | (2006.01) |
| *G06F 17/30* | (2006.01) |
| *G06F 3/0481* | (2013.01) |

(52) U.S. Cl.
CPC ........ *G06F 17/2247* (2013.01); *G06F 3/0481* (2013.01); *G06F 3/04815* (2013.01); *G06F 17/212* (2013.01); *G06F 17/30905* (2013.01); *G06F 2203/04806* (2013.01); *G06T 2200/24* (2013.01)

(58) Field of Classification Search
CPC .................. G06F 17/30061; G06F 3/04815
See application file for complete search history.

(56) References Cited

U.S. PATENT DOCUMENTS

| | | | |
|---|---|---|---|
| 2008/0028068 A1 | 1/2008 | Nochta et al. | |
| 2008/0104027 A1* | 5/2008 | Imler ................ | G06F 17/30241 |
| 2010/0318470 A1 | 12/2010 | Meinel et al. | |
| 2011/0066282 A1* | 3/2011 | Bosscher ............... | B25J 9/1676 |
| | | | 700/248 |
| 2012/0151408 A1* | 6/2012 | Groth .................... | G06F 3/0481 |
| | | | 715/799 |
| 2013/0117328 A1 | 5/2013 | Shagrithaya et al. | |
| 2013/0222385 A1* | 8/2013 | Dorsey .................. | G06T 11/20 |
| | | | 345/427 |
| 2013/0321268 A1* | 12/2013 | Tuck ....................... | G06F 3/041 |
| | | | 345/157 |
| 2014/0280180 A1* | 9/2014 | Edecker ............ | G06F 17/30598 |
| | | | 707/740 |

FOREIGN PATENT DOCUMENTS

DE 20 2010 004 430 9/2010

OTHER PUBLICATIONS

Stecb, Make a div center of viewport—Horizontally and vertically found at http://stackoverflow.com/questions/9622354/make-a-div-center-of-viewport-horizontally-and-vertically, Mar. 8, 2012, Stack Exchange Inc, p. 1.*

(Continued)

*Primary Examiner* — Scott Baderman
*Assistant Examiner* — Seung Jung
(74) *Attorney, Agent, or Firm* — Klarquist Sparkman, LLP

(57) ABSTRACT

A user interface allows zooming and panning of a web-based wall that can support a wide variety of content. Various natural user interface features can be implemented to allow users to interact with content in an intuitive way. Technical infrastructure such as a zoom engine, bounding boxes, and content sharing enable implementation of a rich set of features that are instantly grasped by users. A minimap can provide a helpful overview of content.

17 Claims, 21 Drawing Sheets

(56) References Cited

OTHER PUBLICATIONS

Drkawashima, css—Zoom Vs Scale in CSS3 found in http://stackoverflow.com/questions/26488960/zoom-vs-scale-in-css3, Nov. 3, 2014, Stack Overflow, pp. 1-2.*
"MiniMap," WoWWiki.wikia, www.wowwiki.com, visited May 4, 2015, 3 pages.
"Microsoft OneNote," *Wikipedia*, visited May 4, 2015, 6 pages.
Henry, "Five Best Mind Mapping Tools," lifehacker, lifehacker.com, visited May 4, 2015, 5 pages.
"Mind map," *Wikipedia*, visited May 4, 2015, 6 pages.
"Tele-board: Enabling efficient collaboration in digital design spaces across time and distance," Hasso-Plattner-Institut, hip.de, visited May 4, 2015, 19 pages.
Murally home page, mural.ly, visited May 4, 2015, 3 pages.
Murally tour, mura.ly, visited May 4, 2015, 2 pages.
Padlet Briefcase, padlet.com, visited May 4, 2015, 6 pages.
Padlet Features, padlet.com, visited May 4, 2015, 4 pages.
"Minimum bounding box," *Wikipedia*, visited May 4, 2015, 2 pages.
"Minimum bounding rectangle," *Wikipedia*, visited May 4, 2015, 3 pages.

* cited by examiner

ZOOMABLE WEB-BASED WALL WITH NATURAL USER INTERFACE

BACKGROUND

Various user interface paradigms have evolved to help people better interact with computers. The web browser interface has become ubiquitous in computing environments, but it suffers various drawbacks as currently implemented.

Accordingly, there remains room for improvement.

SUMMARY

The Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

An embodiment can be implemented as a system comprising one or more hardware processors; one or more computer-readable media coupled to the one or more hardware processors; a stored representation of a virtual wall comprising a plurality of viewable items posted on the virtual wall, wherein the viewable items have a z dimension and can overlap; a viewport defining a spatial sub-area of the virtual wall that is currently presented; and a display manager configured to manage the viewport and the stored representation of the virtual wall for presentation in a web-based user interface.

An embodiment can be implemented as a method implemented at least in part by a computing system, the method comprising, for a plurality of viewable items on a virtual wall, maintaining a viewport area that covers less than an entirety of the virtual wall; in a web-based user interface, displaying a portion of the virtual wall corresponding to the viewport area; and in the web-based user interface, zooming the viewport area according to a natural zoom technique.

An embodiment can be implemented as one or more computer-readable media comprising computer-executable instructions that when executed cause a computing system to perform a method comprising displaying an HTML-based virtual wall comprising a plurality of viewable items of a plurality of viewable item types comprising a note type, a document type, a contact type, and a multimedia type, wherein the plurality of viewable items can overlap and have respective z positions on the HTML-based virtual wall; calculating an overall bounding box for the plurality of viewable items; based on the overall bounding box, displaying a minimap of an entirety of the plurality of viewable items of the HTML-based virtual wall; limiting display of the viewable items to those appearing within a viewport that is a sub-region of an entirety of the HTML-based virtual wall; and zooming the viewport according to a natural zoom technique.

As described herein, a variety of other features and advantages can be incorporated into the technologies as desired.

DETAILED DESCRIPTION

Example 1—Example Overview

A variety of user interface paradigms have emerged to address user interaction with collections of data. One familiar interface is the web-based document paradigm. In a typical web-based system, a user is presented with a document (i.e., a web page). The user can scroll within the document and also zoom to increase the size.

However, the conventional web page has a number of drawbacks. For example, it has the look and feel of a confined area. For example, when engaging in creative thinking, brainstorming, or abstract analysis of different kinds of data, it can be more helpful to give the impression of an unconfined area (e.g., navigation can proceed in any direction).

Similarly, web-page zooming is typically based on the upper-left of the document, and content overflows to the lower right of the screen. While such an approach may make sense in the confined paradigm of a web page, a more natural zooming functionality can work better in an unconfined scenario as described herein.

Another limitation of a conventional web-page interface is that items typically exist in isolation. The technologies described herein can be used to relate items together. For example, collisions between items can be implemented via the bounding box mechanism described herein. In this way, users can easily relate items together on the virtual wall.

There are a variety of other features described herein that can present a more natural user interface to users, leading to more comfortable and effective interaction with collections of visualized data.

The features are described as implemented as a virtual wall that can support a rich feature set for interacting with the virtual wall, including zooming, panning, sharing, searching, and the like. The technology infrastructure supporting the virtual wall can result in a superior user interface as described.

Developers can implement the described features to advantage when presenting information to users because users are more likely to adopt the technology. End users also benefit in that they enjoy the features as described.

Example 2—Example Virtual Wall

The technologies described herein can be used to implement a virtual wall as described herein. Although the virtual wall can appear on or be projected by a hardware display device, it can serve as a virtual representation of a real wall, pin board, corkboard, scrum board, bulletin board, or the like with items on it that can be moved around, placed on top of each other, and the like. Thus, the user interface described herein can function as a virtual representation of a real world object, leading to user interface efficiencies as described herein.

Example 3—Example System Presenting a Virtual Wall

Figure 1:
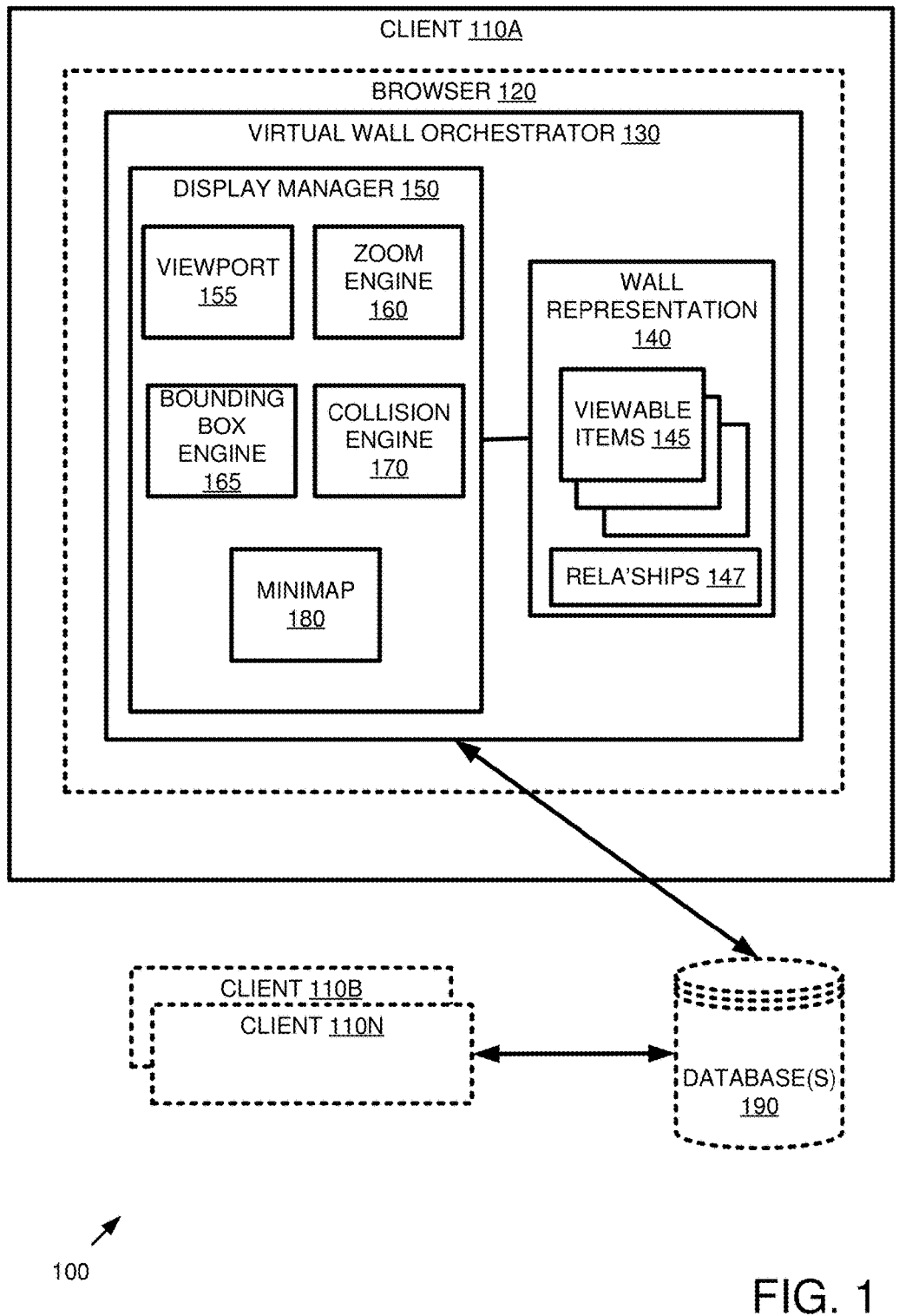
FIG. 1 is a block diagram of an example system configured to present a virtual wall.

FIG. 1 is a block diagram of an example system 100 configured to present a virtual wall. In the example, a client computing system 110A includes a browser 120 that hosts a virtual wall orchestrator 130 that orchestrates user interaction with the virtual wall as described herein.

For purposes of context, other clients 110B, 110N are shown on which the virtual wall can also be presented. For example, a virtual wall can be shared among a plurality of user identifiers and presented simultaneously on a plurality of other computing systems. Virtual wall content can be persisted at a server in one or more databases 190 (e.g., the backend), which can serve as cloud storage.

The virtual wall orchestrator 130 can include a wide variety of functionality for interacting with the virtual wall. For example, the orchestrator 130 can transform raw data representing the wall into a stored (e.g., internal) representation 140 of the virtual wall that includes a plurality of viewable items 145 (e.g., posted on the virtual wall). Such items 145 can have a z dimension and can overlap. The stored representation 140 can include one or more stored relationships 147 of (e.g., between or among) the items. As described herein, a wide variety of viewable item types can be supported. Content for the virtual wall can be maintained locally as appropriate and persisted in the backend databases 190 (e.g., as raw data). Other orchestrators can work with the raw data to perform any of the functionality described herein.

In the example, the stored internal virtual wall representation 140 is presented in a web-based user interface by a display manager 150 that includes a viewport 155 defining a spatial sub-area of the virtual wall that is currently being presented, a zoom engine 160 that is configured to present a natural zoom as described herein, a bounding box engine 165 configured to calculate bounding boxes for one or more viewable items, a collision engine 170 configured to accept bounding boxes from the bounding box engine 165 and determine whether a collision has taken place, and a minimap 180 that shows the entirety of the virtual wall.

The display manager 150 can be configured to manage the viewport 155 and the stored representation 140 of the virtual wall for presentation in a web-based interface. For example, HTML representing the wall can be rendered in a web browser. So, the stored representation 140 of the virtual wall can comprise a Document Object Model (DOM), and viewable items can be implemented as items within the DOM. The viewport 155 can be implemented via cascading style sheet properties (e.g., zoom, margin, and the like) of an HTML container object comprising the virtual wall.

Various other functionality can be included as described herein.

The described computing systems 110A, 110B, 110N can be networked via wired or wireless Internet and/or intranet connections.

Although various components are shown in separate boxes, in practice, component boundaries may vary. For example, the components can be provided as part of an application, browser plug-in, web page, or the like. Other arrangements are possible while still implementing the technologies. For example, although the bounding box engine 165 and collision engine 170 are shown separately, an optimization can be implemented where the two are merged, or parts of one are duplicated in the other, or the like. For example, information about intersecting bounding boxes can be placed so that it can be easily accessed when determining whether there is a collision between viewable items (e.g., when an item is being moved).

In practice, the systems shown herein, such as system 100, can be more complicated, with additional functionality, more inputs, outputs, and the like. In practice, additional functionality related to screen orientation can be included to determine device orientation and adjust the virtual wall presentation accordingly. The data area of the virtual wall is typically much larger than the available screen space, so the screen serves as the described viewport.

The system 100 and any of the other systems described herein can be implemented in conjunction with any of the hardware components described herein, such as the computing systems described below (e.g., comprising one or more hardware processors, computer-readable media coupled thereto, and the like). In any of the examples herein, the virtual wall representation, viewable items, relationships, viewport, minimap, databases, and the like can be stored in one or more computer-readable storage media, machine-readable media, or computer-readable storage devices. The technologies described herein can be generic to the specifics of operating systems, browsers, or hardware and can be applied in any variety of environments to take advantage of the described features.

Example 4—Example Method Presenting Virtual Wall

Figure 2:
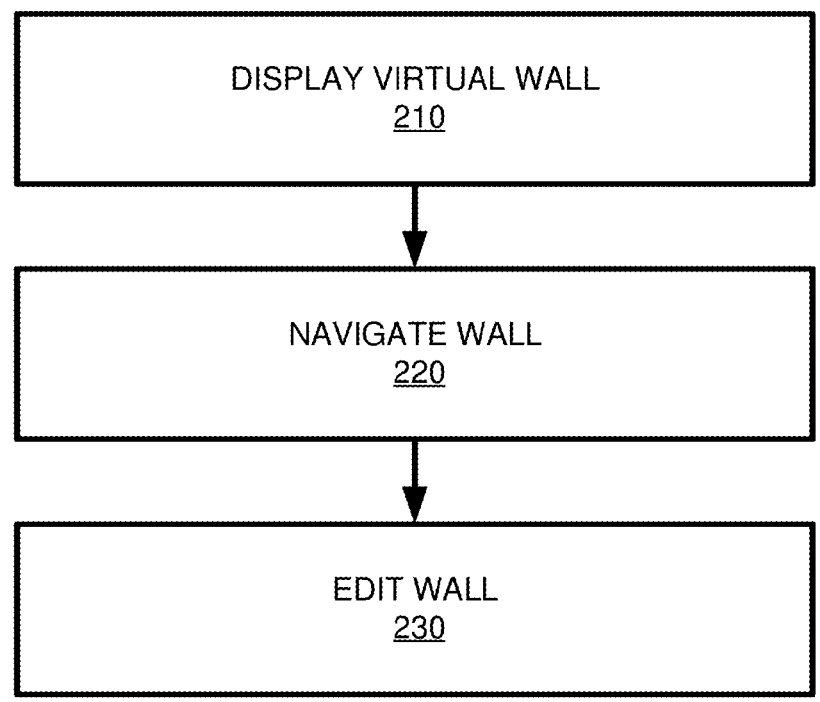
FIG. 2 is a flowchart of an example method of presenting a virtual wall.

FIG. 2 is a flowchart of an example method 200 of presenting a virtual wall, and can be implemented, for example, in the system shown in FIG. 1.

At 210, the virtual wall is displayed. For example, the internal representation of the virtual wall can be rendered for display in a web-based user interface. In practice, if the zoom level is such that the entirety of the virtual wall is not visible, a spatial sub-portion of the virtual wall within a viewport is displayed. The size and location of the viewport can be maintained for the virtual wall. For example, the size and location of the viewport can be determined by the screen size and/or resolution of the displaying device.

At 220, the virtual wall is navigated. A wide variety of navigation is supported, including panning, zooming, and the like. Such navigation can grow or shrink the viewport or move its location with respect to the entirety of the virtual wall.

At 230, the virtual wall is edited. As described herein, a rich set of editing functionality can allow placement of new viewable items, resizing viewable items, moving viewable items, adding content to viewable items, creating relationships between viewable items, and the like. Such edits transform the virtual wall into a new version of the viewable wall that can be rendered for display, saved to computer-readable storage media, and the like. In a sharing scenario, multiple items can be edited by one or more persons at the same time.

Thus, in an example implementation, for a plurality of viewable items on a virtual wall, a viewport area that covers less than an entirety of the virtual wall can be maintained. A portion of the virtual wall corresponding to the viewport area can be displayed in a web-based user interface. The viewport can be zoomed in the web-based user interface. As described herein, the zooming can be performed according to a natural zoom technique.

Other functionality such as sharing and searching can also be implemented. For example, the system can share virtual wall content with other computing systems.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices) such as the client computing system or the like.

The illustrated actions can be described from alternative perspectives while still implementing the technologies. For example, "share virtual wall content" can also be described as "receive shared virtual wall content."

Example 5—Example Natural User Interface Features

In any of the examples herein, a wide variety of user interface features can be incorporated into the technologies, including natural user interface features that allow for more efficient interaction by users with the virtual wall.

Figure 3:
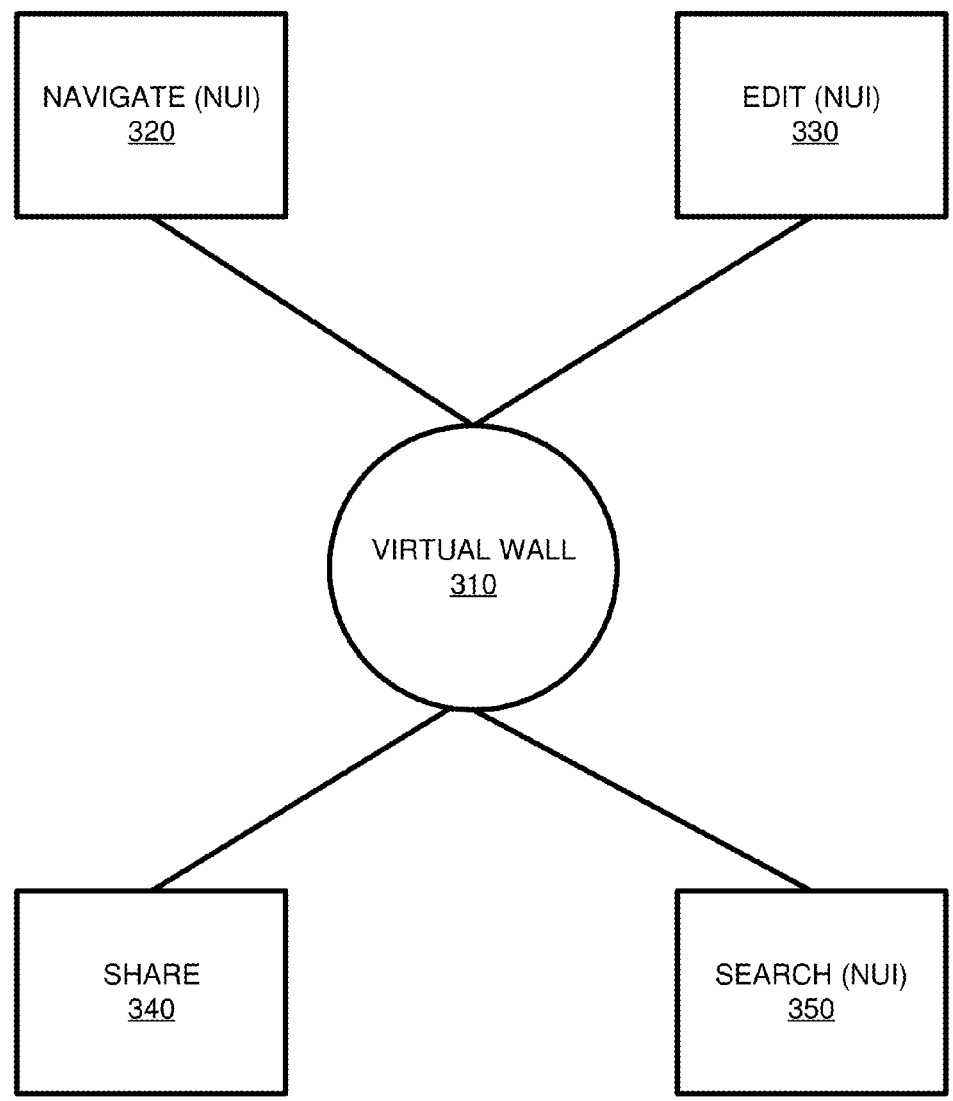
FIG. 3 is a block diagram of an example feature set supporting a virtual wall.

FIG. 3 is a block diagram of an example feature set 300 supporting a virtual wall 310.

The navigate features 320 can include a wide variety of natural user interface features for viewing movable items, moving viewable items on the virtual wall, stacking items on the virtual wall, zooming the viewport, panning the virtual wall, a minimap of the virtual wall, and the like as described herein.

The edit features 330 can also include natural user interface features such as bumping viewable items together (e.g., to form relationships), a viewable item palette to create new viewable items on the virtual wall, adding content to items (e.g., typing notes or annotations) and the like. Viewable items can also be deleted (e.g., by dragging viewable items to a displayed trash bin).

The share features 340 can include sharing a wall with others (e.g., parallel display and editing, collaboration, and the like), managing permissions, and the like.

The search features 350 can include visual search of the virtual wall and the like. Natural user interface features for searching can also be implemented in that the virtual wall appears as a real wall onto which items are placed. Search results can be depicted visually on the virtual wall itself.

Other features can be incorporated as described herein.

Various combinations of the features lead to more natural interaction by users. Therefore, a user is more likely to adopt the technologies and benefit from the automated processing that can be provided, including sharing, searching, and the like.

Example 6—Example User Interface

Figure 4:
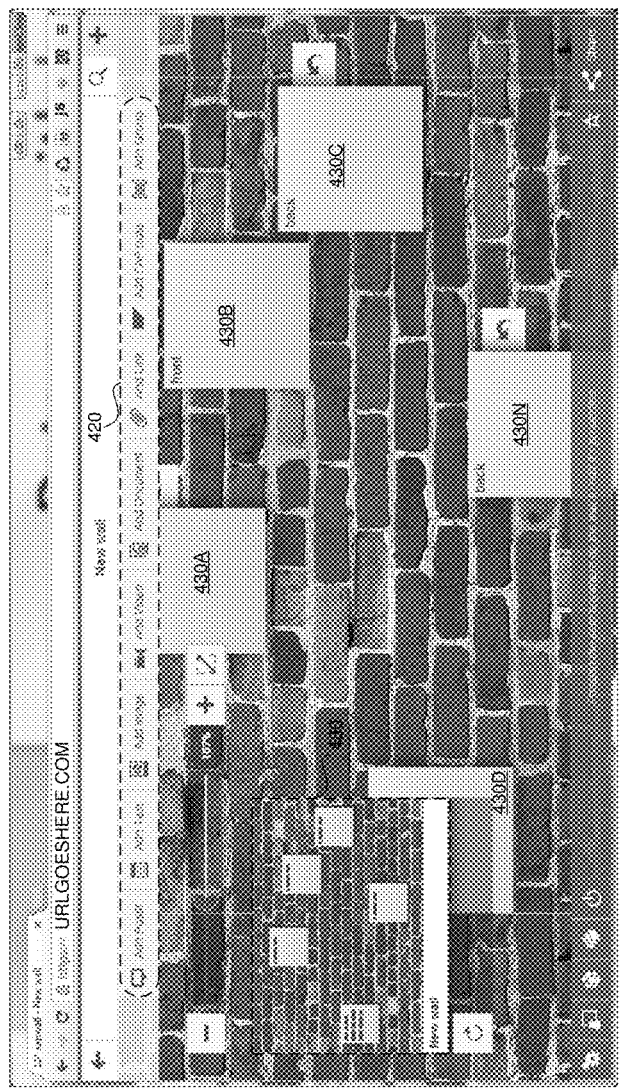
FIG. 4 is a screen shot of an example user interface presentation of a virtual wall.

FIG. 4 is a screen shot of an example user interface presentation 400 of a virtual wall. As shown, the user interface is a web-based user interface presented in a browser and is accessible via a uniform resource locator (URL). Internally, the virtual wall can be represented by HTML and manipulated by JavaScript.

In the example, the interface 400 includes five viewable items in the form of notes 430A-N. The interface 400 also includes a viewable items palette 420 that allows a user to add new viewable items to the interface 400. Examples of viewable item types that can be added include note, text, image, video, document, link, group, and the like. In practice, other viewable item types can be supported.

A zoom bar is also shown at 107%. In practice, the location of user interface elements such as the zoom bar can be varied.

The interface includes a minimap 480 that shows the entirety of the virtual wall for perspective and reference as described herein.

A user can navigate the user interface 400 by zooming and panning. New items can be added via the palette 420, and items can be edited by selecting and adding content (e.g., typing text or the like).

Example 7—Example Viewable Items

In any of the examples herein, viewable items can take a variety of forms. Supported viewable item types include note, text, multimedia (e.g., image, video, sound, etc.), document, link, group, contact, and the like. In practice, developers can implement their own items with custom functionality that can be added to the virtual wall.

A group of items can be treated as a single viewable item (e.g., moved together, searched together, named, or the like). Such a group can contain multiple items, whether of the same or different (e.g., mixed) types.

Figure 5:
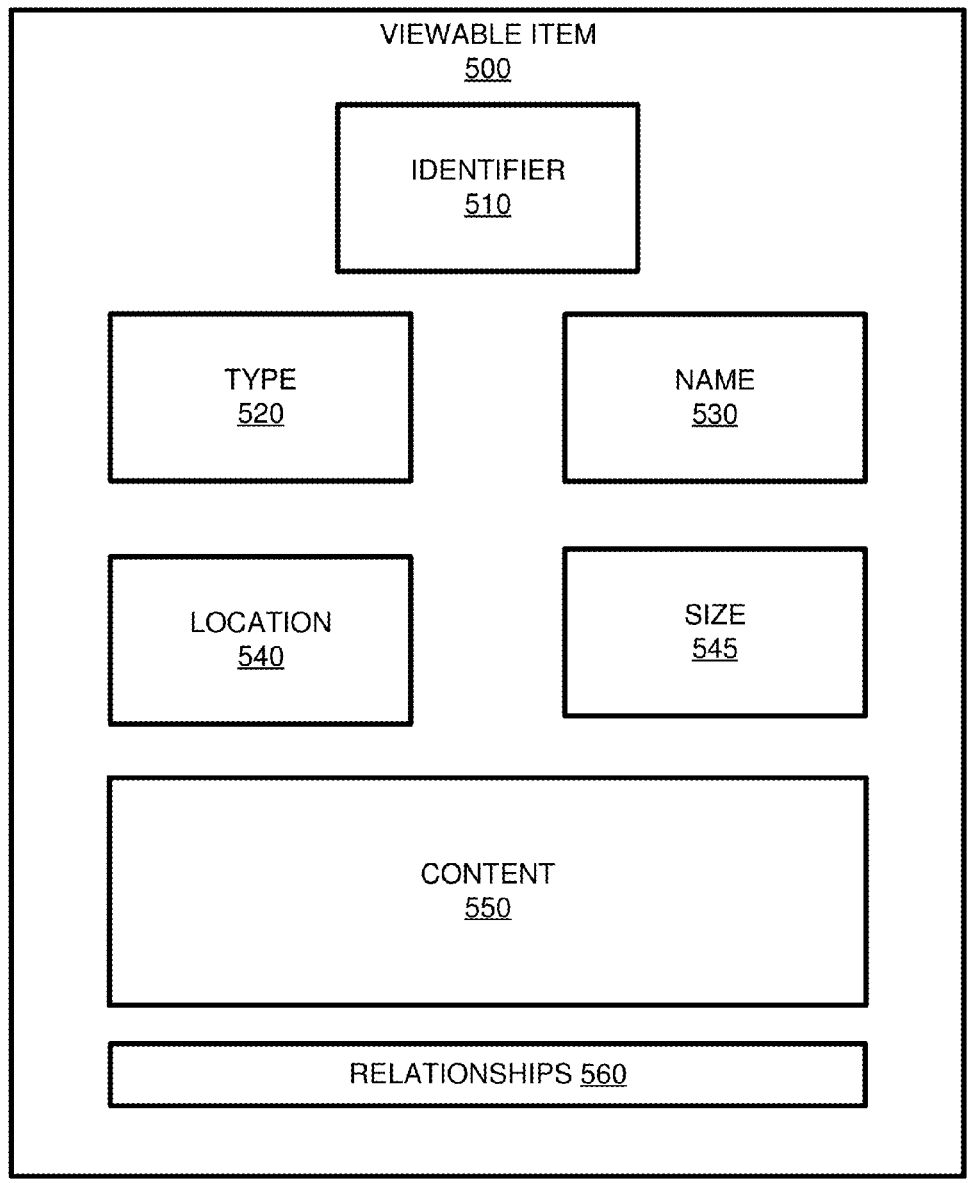
FIG. 5 is an example data structure representing a viewable item of a virtual wall.

FIG. 5 is an example data structure 500 representing a viewable item of a virtual wall and can be used in any of the examples herein. In the example, a unique identifier 510 identifies the item internally to the system so it can be manipulated and identified. As described herein, the data structure 500 can be implemented as an HTML container (e.g., in a <div> element) that resides in a Document Object Model of a web page and is rendered by a web browser. Alterations to the HTML representing the viewable item can be made (e.g., by JavaScript) in response to user interaction with the viewable item (e.g., it is moved, resized, or the like).

The type 520 can indicate the type of viewable item. The name 530 can include a name or title of the item. In some cases, the name is optional or is not displayed. The location 540 indicates the location on the virtual wall at which the viewable item resides. A z (e.g., depth) location can be included. Thus, items can be stacked on top of one another. When rendered, one item can be depicted as in front of another item.

The size 545 indicates the size of the item. Resizing can be accomplished during editing. For example, such editing can be accomplished by dragging an edge or corner of the rendered item, using zoom/pinch gestures or the like; or automatically, such as when miniaturizing a grouped child item as described herein.

Content 550 stores content of the item, which can range from text for a note to video frames for a video. In practice, a reference to the content can be stored instead of the content itself. Content can be split into parts (e.g., front, back, or the like). Additional attributes such as color, font, and the like can be stored as part of the content 550 or as a separate field.

The relationships 560 store one or more relationships to other viewable items. Such relationships can be stored externally to the viewable item 500 if desired. For example, the relationships 560 field can simply store a link. Or, the relationships 560 field can be omitted, and an external data structure consulted to see if there are any relationships.

Various other fields can be maintained in the viewable item data structure 500. For example, one or more bounding boxes can be explicitly stored or implied via the location 540 and the size 545.

Although the representation 500 can be manipulated locally (e.g., when moved, edited, or the like), its content can be persisted externally in the cloud as described herein. Sharing can likewise be accomplished.

Upon creation, a default size and content can be implemented based on the type of the viewable item. For example, notes can default to a particular color.

Example 8—Example Virtual Wall Representation and Web-Based Interface

In any of the examples herein, the virtual wall itself can be persisted as a set of viewable items. A background image or pattern can also be included (e.g., as configured by a user, default, or the like). The name, owner, and permissions of the wall can also be persisted. Administrative rights can be used to change attributes and implement sharing as appropriate.

In any of the examples herein, the virtual wall user interface can be web-based. As a result, the virtual wall is sometimes called a "web-based virtual wall." Such a web-based user interface can support display in a web browser. The wall can be represented as a Document Object Model (DOM) based on an HTML container object populated by HTML DIVs representing the individual viewable items, which are instantiated based on the persisted virtual wall. Cascading Style Sheet (e.g., CSS3 or the like) properties can be used and adjusted during rendering and interaction to implement zoom, size, margins, and the like. The browser can then render the virtual wall for display.

Although a typical web page suffers from drawbacks, particularly with panning and zooming, the described implementation can leverage web-based features to present a natural user interface as described herein. Technical solutions can be applied to the web page environment so that the panning and zooming are performed in unconventional ways that lead to a more natural user interface.

The web-based representation of the user interface can be implemented as the rendered HTML, which can be presented by any of a number of web browsers. JavaScript can be used to manipulate and update the underlying representation in response to user interaction. In practice, a very large area (e.g., 100,000×100,000 pixels or the like) can be used so that it is unlikely that an edge of the virtual wall will be reached. Negative margins on top and sides can be set on the virtual wall so that the wall extends equally (e.g., substantially equally) in all four directions (e.g., up, down, right, and left) and appears to extend endlessly in all four directions.

As a result, a center-based document paradigm can be implemented instead of an upper-left-corner-based document paradigm. Such a center-based document paradigm is appropriate in an unconfined scenario because the wall is open to being moved in any direction, and additional items can be added in any of the directions as well. In a text-based document, it makes sense to start in the upper-left and move to the lower-right. However, with visual items on a virtual wall, a center-based, unconfined solution can provide an overall superior and more efficient user interface.

The user interface can truly function as a virtual representation of a real wall or pinboard as described herein, thereby better representing the real world object itself.

One advantage of implementing a web-based virtual wall user interface is that the wall can be rendered and shown on any device that has a browser supporting web-based standards such as HTML, JavaScript, CSS, and the like. Additional runtime functionality can be avoided by leveraging HTML, JavaScript and/or CSS features to implement the wall across a wide variety of devices (e.g., desktop, tablets, mobile phones), regardless of platform (e.g., PC, Apple, Linux, or the like). Functionality from the UI5 library can also be incorporated with similar benefits.

Open standards can be used to implement the technologies, resulting in more widespread adoption. Content can more easily be stored, and sharing can be better accomplished in web-based implementations.

Via the technologies herein, a standard browser can be transformed into a new content viewing tool.

Example 9—Example Viewport

Figure 6:
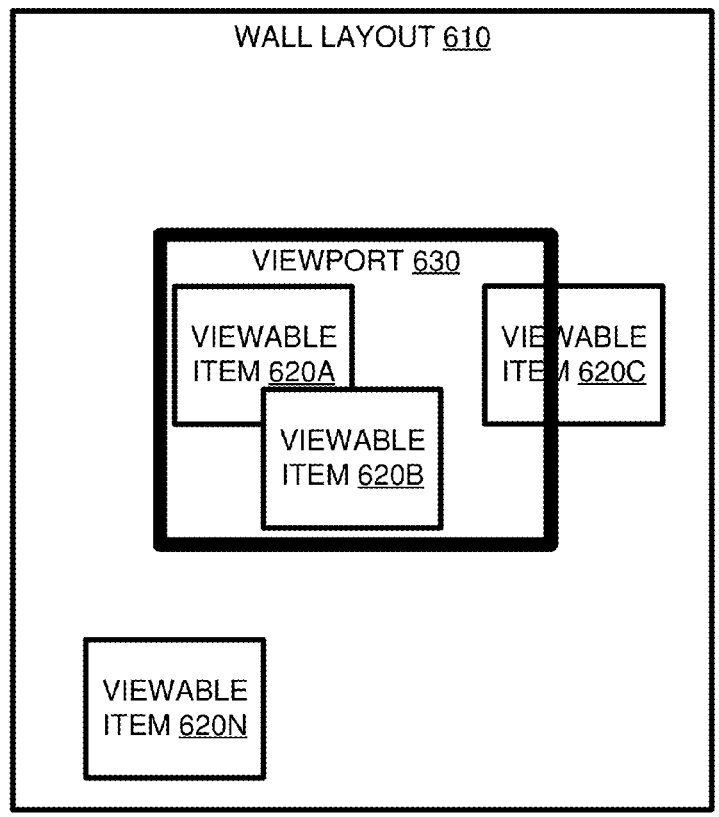
FIG. 6 is a block diagram showing a viewport for a virtual wall.

In any of the examples herein, a viewport can be provided through which the virtual wall can be viewed. Such an arrangement allows the virtual wall to be larger than the user interface (e.g., some portions are outside of the viewport). FIG. 6 is a block diagram showing a viewport 630 for a virtual wall. In practice, the viewport 630 corresponds to the screen real estate available to display a virtual wall. A conversion (e.g., scaling factor) between pixel units can be done depending on the actual screen pixels available and the absolute pixels on the virtual wall that are within the viewport 630. In practice, the virtual unit and measurement of the wall does not need to be pixels. It can also be an abstract unit that is converted to pixels for display.

When screen orientation changes, the aspect ratio of the viewport 630 can be adjusted to match.

The entirety of the virtual wall (e.g., wall layout 610) contains four (4) viewable items 620A-N. However, the viewport 630 is positioned and sized so that only a portion of the items are viewable. Further, it is possible that only a portion of a particular item (e.g., viewable item 620C) is viewable.

As described herein, a bounding box technique can be used to automatically size the viewport 630 so that it covers one or more items (e.g., selected viewable items). For example, the viewport can be resized to just cover the entirety of the viewable items. When the virtual wall is started (e.g., created, opened, or the like), such a default can be implemented. Further, a user can request that the viewport be so sized (e.g., via a menu command, gesture, shortcut key, or the like).

In practice, the size of the viewport as perceived by a viewer can appear to be fixed (e.g., when zooming). In such a scenario, it is the viewable items that appear to change in size. However, the internal representation can consider the viewable items to be of a fixed size, and it is the viewport size that changes.

Example 10—Example Viewport Method

Figure 7:
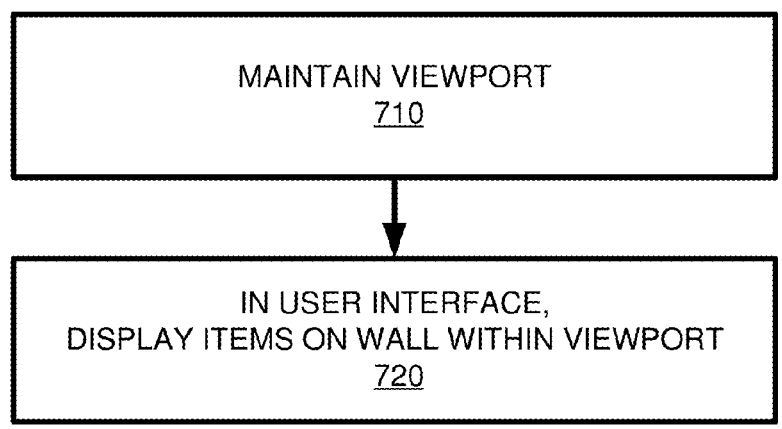
FIG. 7 is a flowchart of an example method of implementing a viewport for a virtual wall.

FIG. 7 is a flowchart of an example method 700 of implementing a viewport for a virtual wall and can be implemented, for example, with the viewport of FIG. 6.

At 710, a viewport is maintained for the virtual wall. In practice, a size (e.g., in pixels) and location (e.g., with respect to the virtual wall) of the viewport can be stored. For example, an offset from center of the virtual wall, offset from corner of the virtual wall, or the like can be stored. The viewport can be automatically resized as described herein.

As the user interface is panned and zoomed, the viewport can change location and size. A conversion between actual screen real estate pixels and absolute pixels of viewable items on the virtual wall can be implemented to scale items appropriately within the viewport (e.g., via a viewport transformation).

At 720, the viewable items (or portions thereof) within the viewport are displayed in the user interface.

Example 11—Example Zooming

In any of the examples herein, the viewport can be zoomed in or out. In a conventional web page view, browser zooming causes the lower right of the screen to move off the page, while the upper left stays stationary. Conventional zooming is not done naturally but by increasing font size and enlarging other content.

In any of the examples herein, a natural zoom effect can be achieved by implementing a camera-type zoom based at the center of the viewport. For example, during zooming in and out, the center of the viewport remains at the center of the viewport. Thus, an unconfined, center-based user interface can be supported as described herein.

To achieve such a result in a web-based, Document Object Model (DOM) representation of the virtual wall, the style of the virtual wall element can be varied in response to zoom commands. The zoom level can be changed, and the mathematical translations performed to calculate and set appropriate margins for the element. In many cases, the margins take on a negative value to keep the center of the virtual wall in the middle of the viewport.

Zoom commands can be received in any number of ways (e.g., keyboard, mouse, slider, or the like). In some cases, an automatic zoom can be implemented (e.g., to automatically zoom so that the entirety of items just fits in the viewport, to automatically zoom so that a selected set of items just fists in the viewport, or the like).

A zoom engine can be configured to enlarge or shrink the viewport and simultaneously apply a natural zoom effect to the spatial area of the virtual wall that is currently presented in the viewport.

In practice, zoom events directed to a native zoom functionality can be detected, and a custom zoom can be implemented in place of or in addition to native zooming. Such zooming can be done relative to the middle of the screen. A cascading style sheet property (e.g., zoom, scale, or the like) can be set responsive to detecting the zoom events, thereby accomplishing the zoom. In practice, zoom events can be intercepted to implement custom zoom functionality. Or, alternative events can be defined on top of the native zoom, so that the native zoom is applied in addition to the custom, natural zoom functionality.

Also, instead of simply zooming the display pixels by magnifying or shrinking them in a device-specific way, the relationship between a fixed-sized viewport and the underlying virtual wall can be changed by changing CSS properties that are supported across a large number of devices and device types. For example, such a technique can be used when zooming in or out (e.g., the viewport includes more and more of the virtual wall).

Example 12—Example Zoom Implementation

Zooming can be accomplished by positioning the virtual wall relative to the viewport as described herein. When the viewport is calculated and the wall is positioned appropriately, the zooming can function automatically by setting a zoom level. Panning can also similarly function. After the viewport is set up, it is sufficient to subtract or add the distance the mouse cursor (or other movement mechanism) made to the wall margin.

Zooming can be accomplished by calculating a viewport, positioning the virtual wall relative to the viewport, and implementing the natural zooming.

Figure 8:
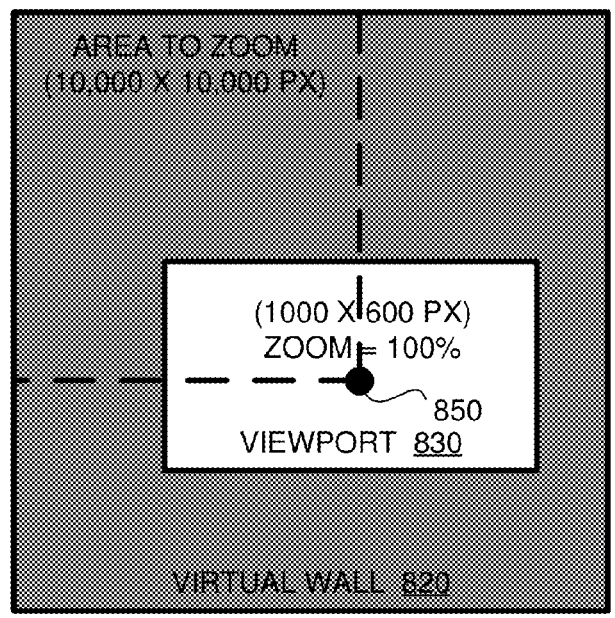
FIGS. 8 and 9 are block diagrams showing an example natural zoom implementation.
Figure 9:
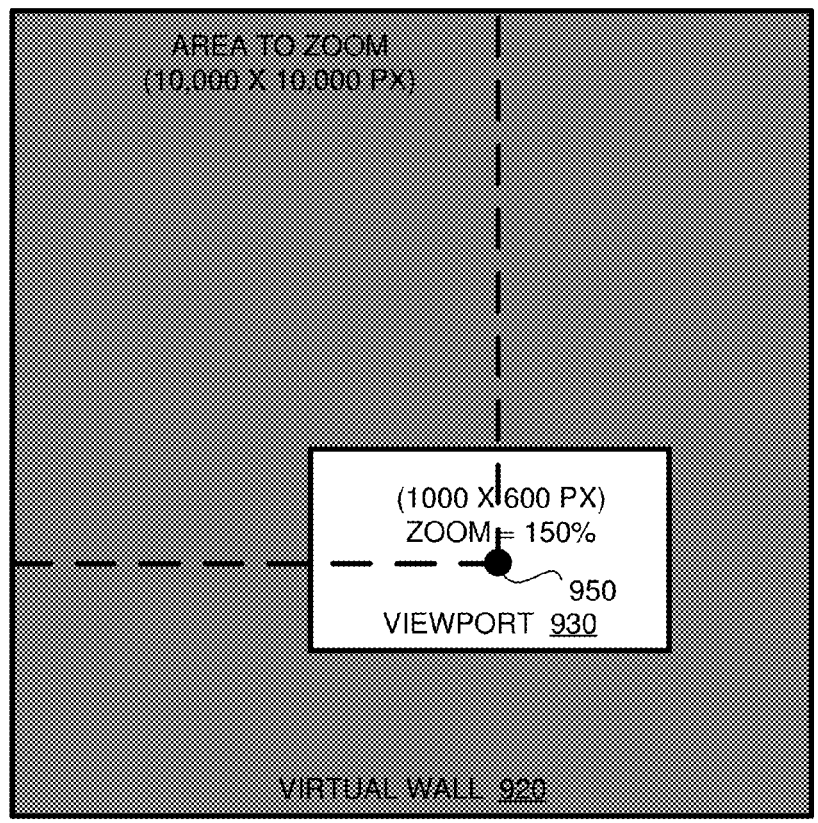

FIGS. 8 and 9 are block diagrams showing an example natural zoom implementation. FIG. 9 shows the wall of FIG. 8 after it has been zoomed from 100% to 150%, and overflow is based on the viewport. In the examples, the virtual wall 820, 920 is 10,000×10,000 units (e.g., pixels or virtual units), and the viewport 830, 930 is 1000×600 pixels (e.g., screen or browser size). As shown, no scrollbars need be shown (e.g., they can be omitted).

In the arrangement 800 of FIG. 8, the viewpoint 850 (e.g., the middle of the viewport) is at (6000,7000) in wall space and (500,300) in screen space (e.g., of the viewport 830). The calculated CSS settings for the area to define the zoom point are as follows:

margin-top: −7000
margin-left: −800
zoom: 1.0

In the arrangement 900 of FIG. 9, the viewpoint 950 (e.g., the middle of the viewport) is at the same location (6000, 7000) in wall space and (500,300) in screen space (e.g., of the viewport 930). The calculated CSS settings for the area to define the zoom point are as follows:

margin-top: −7000
margin-left: −800
zoom: 1.5

Thus, in any of the examples herein, the viewpoint location (e.g., in the wall space) can be maintained constant during zooming.

Viewport calculation can be accomplished by transforming the screen coordinates from the browser window to the wall coordinates in the wall space. A transformation function can transform the screen size in px (e.g., pixels) to the virtual measure of the wall (e.g., px or some other unit of measure). Then, the bounding box of the items on the virtual wall can be calculated and multiplied by the zoom value to calculate the dimensions of the items with the current zoom value.

One can subtract the two measurements to calculate the difference between the viewport and the shown items size in the wall unit.

If the difference is less than 0, the items are larger than the current viewport, and one can optionally define a minimum distance between the viewport and the items (e.g., 32 units/pixel in the example shown in FIG. 8). The items can have a buffer spacing distance between the border of the screen and the bounding box.

A new viewpoint (e.g., middle of the viewport) position can be calculated as the middle of the bounding box of the items using a formula shown below. Without the spacing technique, one can add half of the width/height of the bounding box to the upper left corner of the bounding box. The middle point of the bounding box can now be set as the new viewpoint and can be used to position the wall and as a new center for the natural zoom.

Alternatively, the viewpoint can be set by not taking into account the items on the wall and simply loading the viewpoint from the last user session or to place it in the middle of the wall (e.g., 5000, 5000) as a starting point. However, such an approach can result in the screen appearing empty if the items are positioned somewhere else on the wall.

After the initial calculation is done, the viewpoint can be moved relatively to (e.g., responsive to) user interface interactions. For example, if the user drags the wall 50 px to the left, then the viewpoint can also be translated to the left by transforming the corresponding value from the screen px to wall space units and deducting it accordingly. Keyboard events can be treated similarly. Pressing the right arrow key can add a fixed value (e.g., 20 px) to the right each time the key is pressed, which can also be applied to the viewpoint (and thus the viewport).

TABLE 1

Formula for Calculating Viewport

```
// formula: viewportSize – zoom(BoundingBox(ItemsOfWall))
deltaX = transformToWallUnit(iViewportWidth) – (oLowerRight.getX( ) –
oUpperLeft.getX( )) * zoomFactor;
deltaY = transformToWallUnit(iViewportHeight) – (oLowerRight.getY( ) –
oUpperLeft.getY( )) * zoomFactor;
// can show a small margin around the viewport to have space between the
items and the screen
deltaX = Math.max(deltaX, 32);
deltaY = Math.max(deltaY, 32);
// formula: upperleft + invertZoom(viewportSize – deltaSize) / 2
oViewPoint.setX(oUpperLeft.getX( ) +
(transformToWallUnit(iViewportWidth) – deltaX)
* 1 / (zoomFactor * 2));
oViewPoint.setY(oUpperLeft.getY( ) +
(transformToWallUnit(iViewportHeight) –
deltaY) * 1 / (zoomFactor * 2));
```

The wall can then be positioned relative to the viewport. The wall can be positioned relative to the calculated viewpoint that defines the middle of the screen (e.g., viewport) in the wall dimensions. One can set the CSS property "margin" to a negative value that is calculated based on the viewpoint position and the wall size itself. In the example, there is a viewpoint at (6000, 7000) on a wall that is 10,000×10,000 px (or virtual units) large in the wall space. The viewport size is 1000 px×600 px and corresponds to the screen or browser window size on which the virtual wall is rendered. Therefore, the wall can be positioned relatively to the viewpoint by setting the margin-left to the negative value of the viewpoint's x coordinate and the margin-top property to the negative value of the viewpoint's y coordinate. Thus, the negative value for the cascading style sheet property is calculated as an additive inverse of a coordinate in a middle of the viewport area (e.g., the coordinates of the viewpoint).

For browsers that do not support the CSS property "zoom," one can add the relative distance from the viewpoint to the middle of the wall multiplied by the zoom factor. An example implementation is shown in Table 2.

TABLE 2

Position Wall Relative to Viewport

```
if (!model.Config.getZoomCapable( )) {
  // firefox + internet explorer + safari: adjust wall to viewpoint
before deducting viewpoint
  // add the distance from viewpoint to the middle of the wall
multiplied by the inverted zoom
  // marginX = (viewpointX + (viewpointX – 5000) *
(zoomPercentage/100 – 1)) * –1
  // marginY = (viewpointY + (viewpointY – 5000) *
(zoomPercentage/100 – 1)) * –1
  $this.css("margin", "–" + (oViewPoint.getY( ) + (oViewPoint.getY( ) –
5000) * ((this.getZoom( ) / 100) – 1)) + "px 0 0 –" + (oViewPoint.getX( )
+
(oViewPoint.getX( ) – 5000) * ((this.getZoom( ) / 100) – 1)) + "px");
} else {
  // other browsers; simply deduct the viewpoint
  $this.css("margin", "–" + oViewPoint.getY( ) + "px 0 0 –" +
(oViewPoint.getX( ) + "px");
}
```

Natural zooming can then be implemented. Instead of using the native zooming mechanism of the browser, one can attach manually to the mousewheel and keyboard events for zooming and update the CSS property "zoom" (e.g., :1.5) for capable browsers or "transform" (e.g., scale:1.5) for others. Due to the viewport and wall setup before, the area is zoomed relative to the middle of the screen. In contrast to the default zooming (e.g., zooms relative to the upper left corner of the viewport), such an approach can give a very natural impression of zooming (e.g., like a camera zoom).

TABLE 3

Natural Zoom

```
if (sap.ui.Device.browser.internet_explorer) { // scale
  $this.css("-ms-transform", "scale(" + (fZoomValue / 100) + ")");
} else if (sap.ui.Device.browser.firefox) { // scale
  $this.css("-moz-transform", "scale(" + (fZoomValue / 100) + ")");
} else if (sap.ui.Device.browser.safari) { // scale
  $this.css("-webkit-transform", "scale(" + (fZoomValue / 100) + ")");
} else { // zoo
  $this.css("zoom", fZoomValue + "%");
}
```

Scrollbars can be disabled as shown. For example, a cascading style sheet property "overflow:hidden" can be set on the wall.

The coding details of the implementation can be varied while still accomplishing the described techniques. Similarly, the sizes of the virtual wall and viewport can be modified as appropriate, resulting in different calculations (e.g., instead of using a value of 5000, which marks the center of a virtual wall of size 10,000, any value that is half of the virtual wall size can be used).

Example 13—Example Minimap Generation

Figure 10:
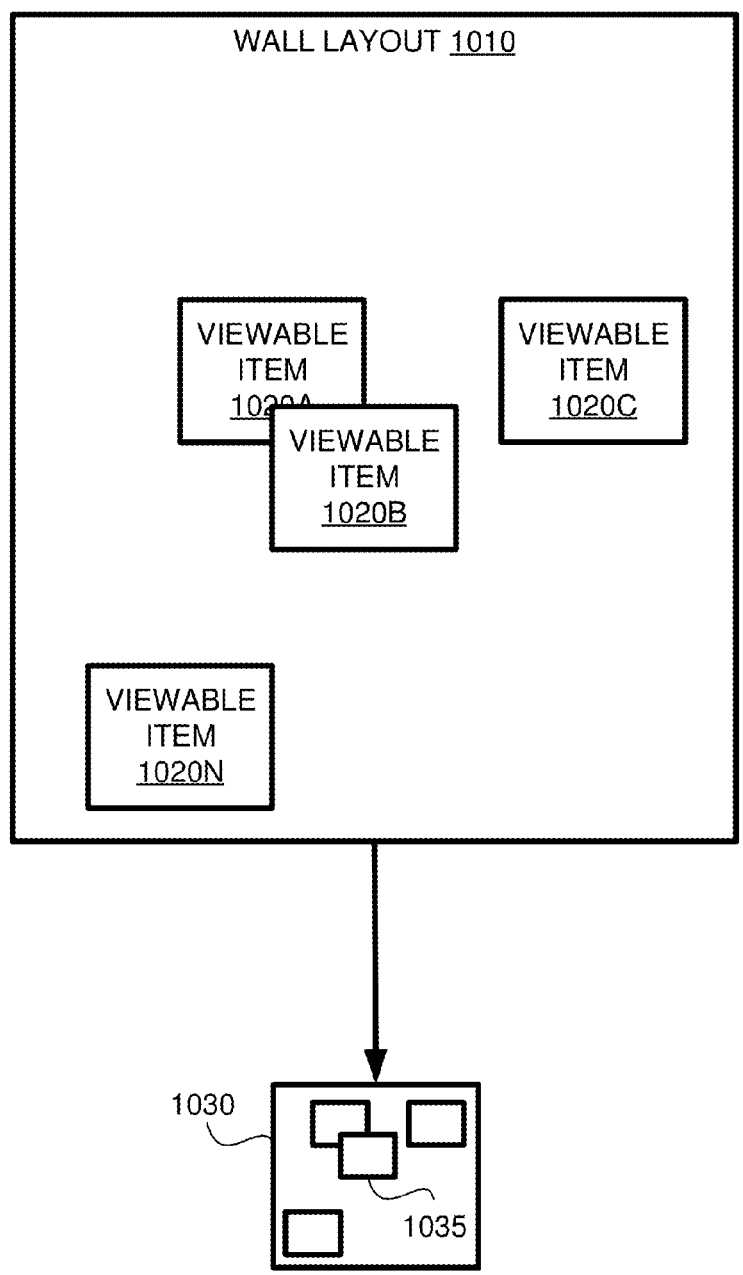
FIG. 10 is a block diagram of example minimap implementation for a virtual wall.

In any of the examples herein, a minimap can be generated for a virtual wall. FIG. 10 is an example minimap implementation 1000 for a virtual wall. In a web-based implementation, the minimap can be implemented as a canvas object. For example, the canvas object can float on top of the user interface or be presented as a thumbnail as described herein.

The minimap 1030 can be generated from the entirety of the viewable items of virtual wall (e.g., the spatial wall layout 1010). Viewable items 1020A-N are reduced in size and incorporated into the minimap 1030 (e.g., as a miniaturized representation 1035).

The size of the minimap 1030 can be fixed (e.g., to a minimap default size). However, the spatial area covered by the minimap 1030 can vary according to the spatial extent of viewable items on the wall layout 1010. Thus, the scale can vary.

For example, a bounding box for the entirety of the viewable items on the wall can be calculated, and such an overall bounding box can be used to determine what area of the virtual wall is presented in the minimap 1030. A small buffer around the bounding box can be used to present a more intelligible minimap 1030 (e.g., so that items do not abut the edges of the minimap 1030).

In practice, the minimap can serve as a thumbnail that allows a user to easily identify a particular wall out of a collection of walls (e.g., displayed as a gallery of minimaps).

However, during presentation of a given virtual wall, the minimap 1030 can be updated in real time as the wall is edited (e.g., during movement of objects, when objects are added, or the like).

Such a mechanism can be helpful because the virtual wall can extend well beyond the screen real estate available in the user interface. Without the minimap, items may be lost or overlooked.

Example 14—Example Minimap Method

Figure 11:
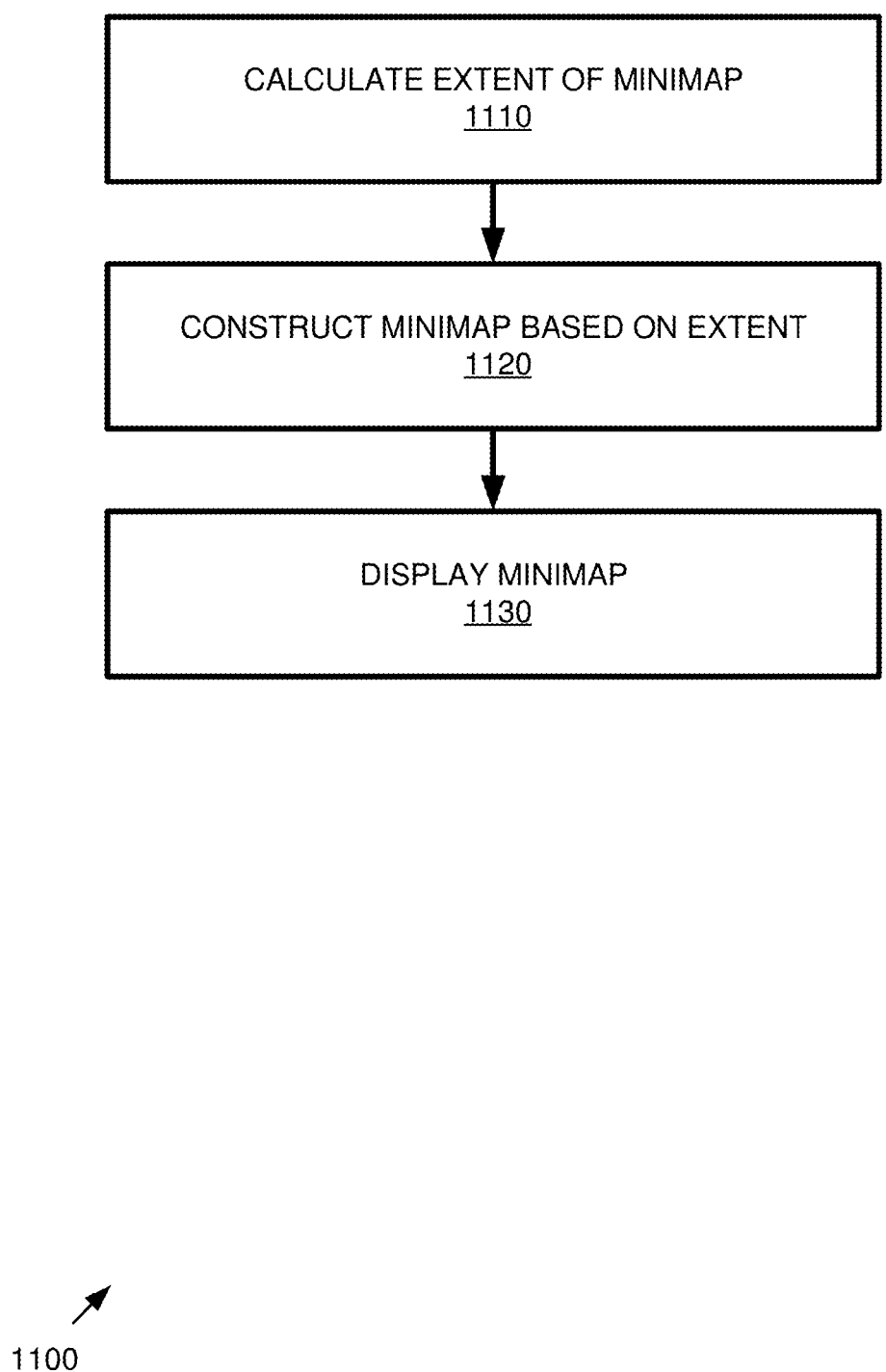
FIG. 11 is flowchart of an example method of implementing a minimap for a virtual wall.

FIG. 11 is flowchart of an example method 1100 of implementing a minimap for a virtual wall and can be used to implement the minimap shown in FIG. 10.

At 1110, the extent of the minimap is calculated. For example, as described herein, a bounding box around the entirety of viewable items on the virtual wall can be calculated.

At 1120, the minimap is constructed based on the extent. For example, the scale of the minimap can be determined based on the extent (e.g., how many pixel units in the virtual wall are represented by a pixel in the minimap). Miniaturized versions of the viewable items can then be rendered on the minimap.

At 1130, the minimap is displayed. As described herein, the minimap can serve as a static thumbnail of a virtual wall (e.g., to allow choice of walls). Alternatively, the minimap can be displayed along with the virtual wall and updated in real time.

The minimap can be used to navigate quickly to other parts of the virtual wall. For example, if clicked on or otherwise activated, a small rectangle on the minimap can be moved to move the viewport to another part of the virtual wall.

Text in the minimap can be represented (e.g., as a zig zag line) to avoid aliasing and to keep the items more abstract.

Items on the minmap can be rendered as canvas shapes (e.g., rectangles, circles, polygons, outlines, or the like) to avoid aliasing and keep abstraction.

The background (e.g., background color, background image, or the like) of the virtual wall can also be shown in the minimap.

Example 15—Example Virtual Wall Choice Via Minimap

Figure 12:
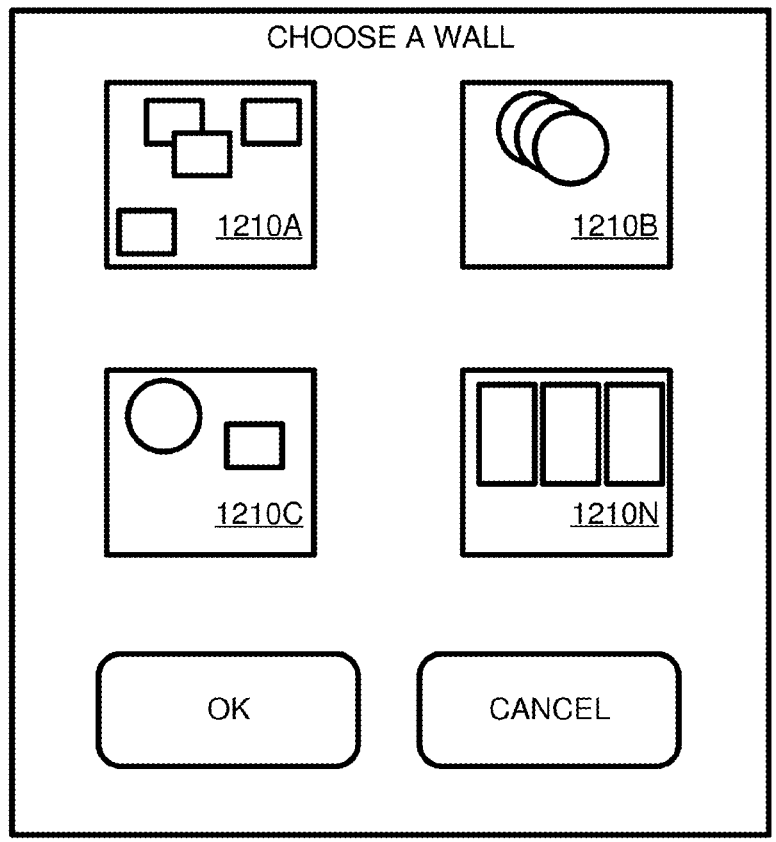
FIG. 12 is an example user interface for choosing a virtual wall based on its minimap.

In any of the examples herein, a user interface can use minimaps to allow a user to choose a virtual wall. FIG. 12 is an example user interface for choosing a virtual wall based on its minimap.

In the example, a plurality of minimaps 1210A-N are displayed for selection. In response to selection of one of the minimaps 1210A-N, the corresponding virtual wall can be identified and used (e.g., loaded, configured, shared, deleted, or the like).

Example 16—Example Bounding Boxes

In any of the examples herein, a bounding box mechanism can be used when interacting with viewable items. A viewable item can have one or more bounding boxes associated with it. Such bounding boxes can be calculated on demand for one or more viewable items. For example, a display manager (e.g., bounding box engine) can be configured to calculate a bounding box for a single item or for a plurality of viewable items.

Such bounding boxes can be useful for determining how to size a minimap, how to automatically size a viewport, detecting collisions, detecting near collisions, and the like. So, a display manager can be configured to calculate an overall bounding box for an entirety of the viewable items on the virtual wall and generate a minimap of the wall based on the overall minimap.

In practice, a bounding box can be designated by a maximum x, minimum x, maximum y, and minimum y (e.g., of one or more viewable items). A spatial box (e.g., rectangle) is therefore implied. The box can thus be represented by two points in two-dimensional space of the virtual wall as described herein.

Example 17—Example Plurality of Bounding Boxes

In any of the examples herein, a viewable item can have a plurality of bounding boxes.

Figure 13:
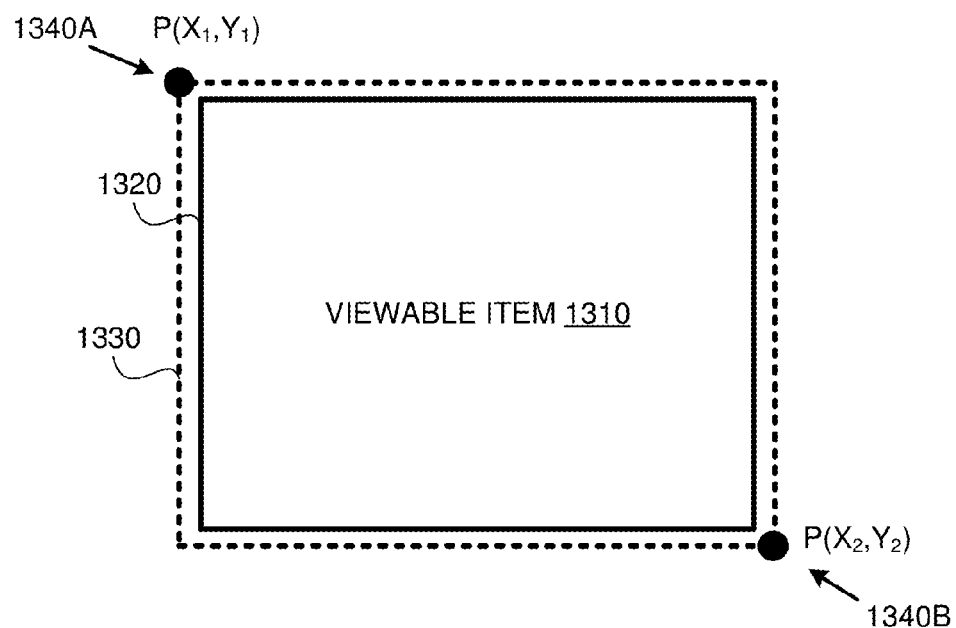
FIG. 13 is a block diagram of a viewable item having a plurality of bounding boxes.

FIG. 13 is a block diagram of a viewable item 1310 having a plurality of bounding boxes 1320, 1330. In the example, a first bounding box 1320 can be associated with the actual edges of the viewable item 1310, and another bounding box 1330 is associated with a buffer zone outside the edges of the viewable item 1310. The buffer zone can be varied according to the current zoom level (e.g., so that it appears uniform regardless of the zoom level).

A plurality of respective collision types can thus be supported as well (e.g., collision types for respective of the bounding box types). For example, a collision can be indicated when the bounding box 1320 intersects the same bounding box of another viewable item, and a near collision (e.g., spatial neighbor) can be indicated when the buffered bounding box 1330 intersects a buffered bounding box of another viewable item.

In practice, a bounding box can be represented by two points (e.g., points 1340A and 1340B represent the buffered bounding box 1330) that are in turn represented by X and Y coordinates (e.g., $X_1$, $Y_1$, $X_2$, $Y_2$). $X_1$ and $X_2$ can be calculated as the lowest and highest values of X. $Y_1$ and $Y_2$ can be calculated as the lowest and highest values of Y. The actual edges of the viewable item 1310 can be used along with a buffer for the buffered bounding box 1330.

Similarly, when a bounding box is calculated for a plurality of items, the lowest and highest values of X and Y (e.g., for the entirety of the items) can be calculated.

Example 18—Example Collisions

Figure 14:
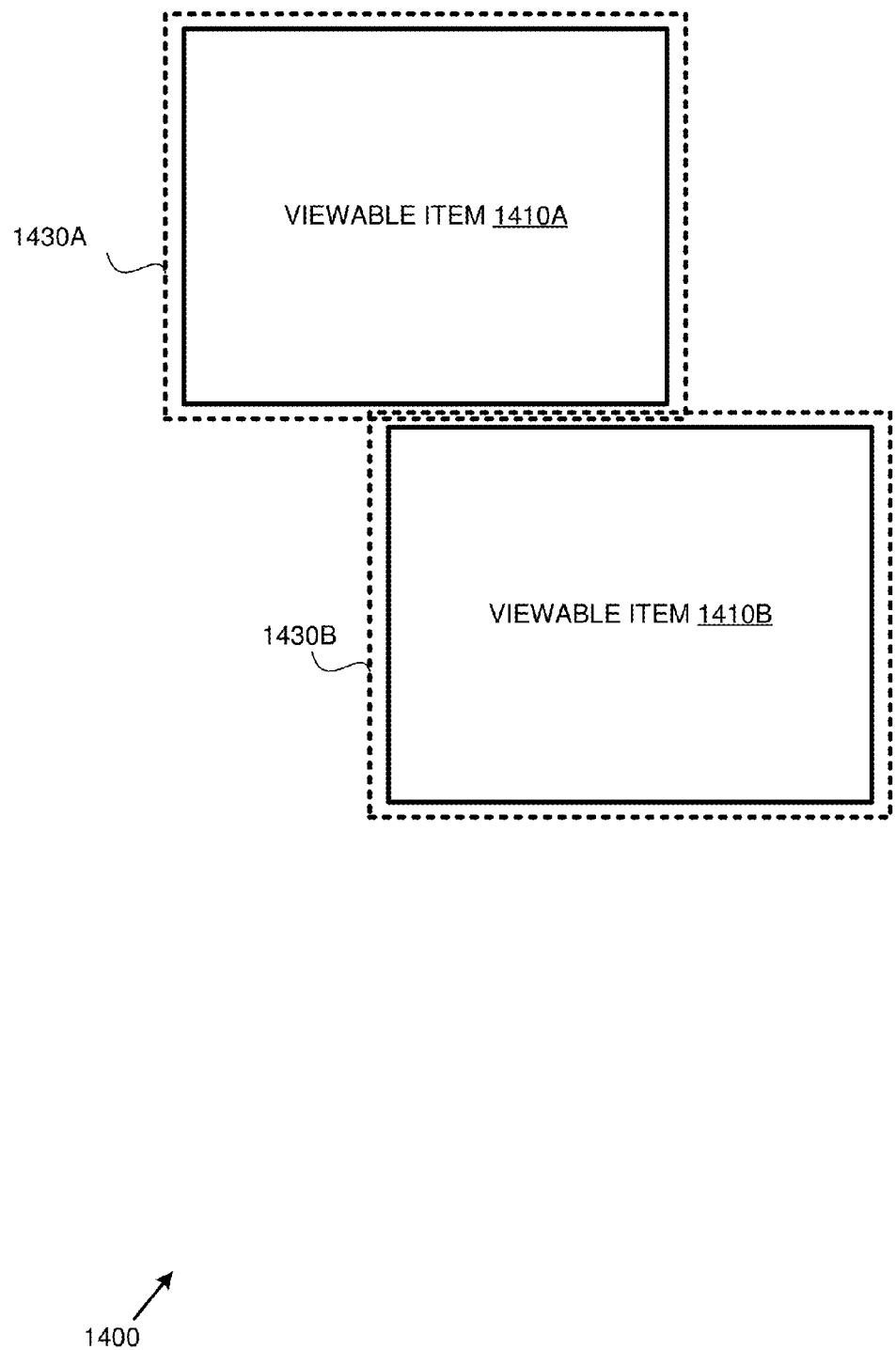
FIG. 14 is a block diagram of a collision between two viewable items based on intersection of their bounding boxes.

In any of the examples herein, collisions can be detected for a variety of purposes. FIG. 14 is a block diagram of a collision 1400 between two viewable items 1410A, 1410B based on intersection of their buffered bounding boxes 1430A, 1430B. As similar approach can be used for an unbuffered bounding box.

Because the buffered bounding boxes 1430A, 1430B are intersecting, a near collision can be indicated for the viewable items 1410A, 1410B, even though they are not touching each other. Such a near collision can be useful to define the items 1410A, 1410B as neighbors or as otherwise having a relationship.

A collision engine can be configured to detect when two viewable items collide and indicate the type of collision. The collision engine can maintain a bounding box for the viewable items as represented in the Document Object Model or in the wall space with an abstract unit of measure, whether the bounding box is stored by the viewable item or not.

Thus, a collision engine can be configured to calculate when a first bounding box of a first viewable item intersects a second bounding box of a second viewable item and further configured to update the stored relationships of the virtual wall to reflect a relationship between the first viewable item and the second viewable item responsive to detecting intersection.

As described herein, the collision engine can support a plurality of bounding boxes of differing sizes for a single item (e.g., inner bounding box and outer bounding box), and it can compute a collision type indicating on which of the plurality of bounding boxes a collision is based.

Example 19—Example Collision Method

Figure 15:
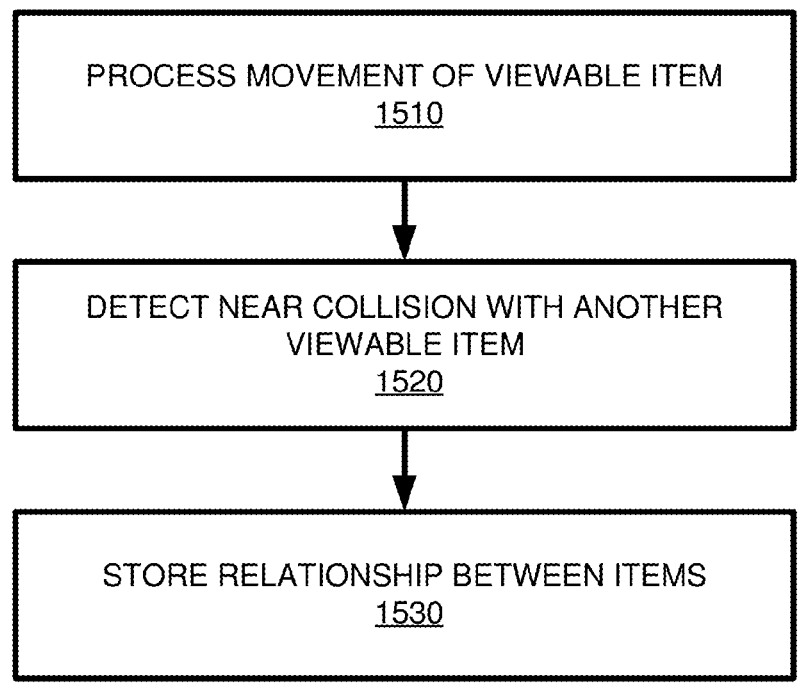
FIG. 15 is a flowchart of an example method of creating a relationship between items based on a near collision.

FIG. 15 is a flowchart of an example method 1500 of creating a relationship between items based on a near collision.

At 1510, movement of a viewable item is processed. For example, a given viewable item can be dragged to a new position on the virtual wall. A buffered bounding box for the viewable item can be computed.

At 1520, a near collision with another viewable item is detected. For example, intersection of the buffered bounding box of the moving item and the buffered bounding box of another (e.g., stationary) viewable item can be detected.

At 1530, responsive to detecting the near collision, a relationship between the two items is stored. Such a relationship can indicate that the items are close, neighbors, siblings, or otherwise related.

To give visual feedback that the collision is detected, a color can be used to indicate the items for which a collision is detected (e.g., highlighting, halo, or the like around the viewable items). Different colors can be used for different collision types (e.g., one color for a near collision and a different color for a collision).

Example 20—Example Collision-Based Relationships

In any of the examples herein, a variety of relationships can be stored and implemented based on collision detection.

For example, storing the relationship can comprise connecting the given viewable item and the other viewable item together. Such connecting can result in the items being movable as a group (e.g., moving one item also moves the other item with it).

For example, storing the relationship can comprise denoting one object as a child of another. Such a parent-child relationship can result in the objects being connected. Other indications of the relationship can be implemented. For example, the child object can be made slightly smaller or a miniaturized version of it implemented while it remains a child of the parent. For example, if a note object is moved so that it collides with another note object (e.g., a given note is dropped on top of the other note), the note can be denoted as a child of the other note, and its size can be slightly decreased. As a result, the two notes are now connected together and moved as a group.

For example, storing the relationship can comprise snapping the given viewable item and the other viewable item together. Such snapping can include visually aligning the items (e.g., to align their tops, sides, bottoms, or the like).

In another example, storing the relationship can simply indicate that the items are related for purposes of searching (e.g., find items having given criteria and their related items, or the relationship itself can be one of the criteria).

The type of relationship can be implemented by default (e.g., a near collision results in a default relationship type). Or, a menu can be presented (e.g., responsive to collision detection) by which a selection of a relationship type can be received. Detecting collisions can also be used for adding or removing items to/from a group of items.

Example 21—Example Search User Interface

Figure 16:
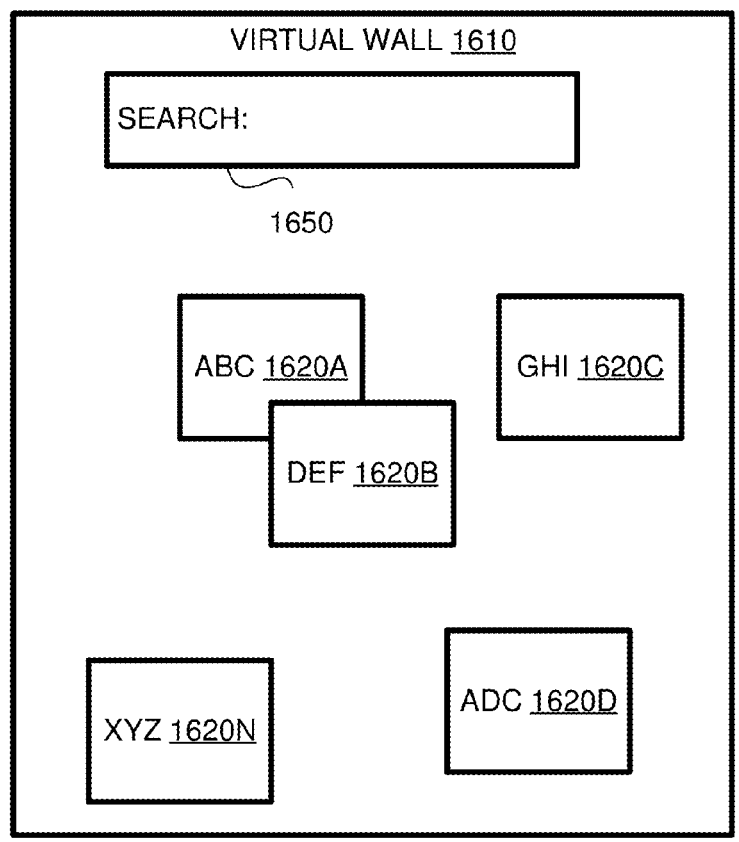
FIG. 16 is an example search user interface for a virtual wall.

In any of the examples herein, a search interface can be provided to search a virtual wall. FIG. 16 is an example search user interface 1600. In the example, the viewable items 1620A-N are displayed on the virtual wall 1610. A search box 1650 is displayed into which a user can type search criteria.

For purposes of description, a simple search box 1650 is shown that simply accepts text. In practice, additional search criteria can be presented (e.g., item type, relationships, or the like).

Figure 17:
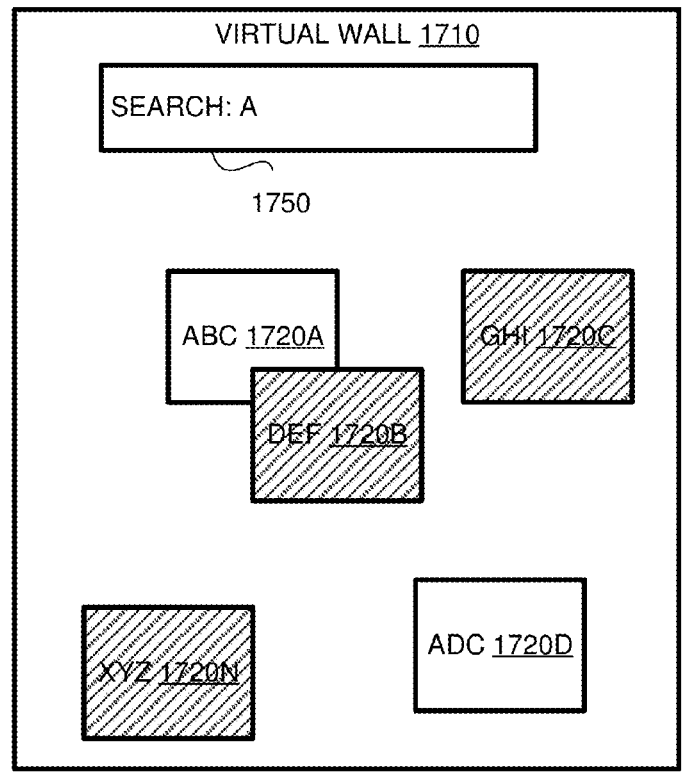
FIG. 17 is an example virtual wall search user interface presenting a search result visually.

FIG. 17 is an example search user interface 1700 presenting a search result visually. The text "A" has been entered into the search box 1750. As a result, those viewable items 1720A, D that meet the search criteria (e.g., contain an "A") are shown, and those that do not 1720B, C, N are not shown (e.g., disappear, are greyed out, or the like). Thus, the results can be presented in place (e.g., in-situ) on the virtual wall itself via alteration of the viewable items.

If the text "AB" were entered, then only a single viewable item 1720 would be shown. Character-by-character (e.g., letter-by-letter) updating of the search results can be implemented, for example, if the "B" is erased and the text "A" remains (e.g., the cursor backs up and deletes the B), then the viewable item 1720D can come back into view. Therefore, the user need not start the search over, but can easily modify it on the fly, and the search results are visually depicted on the visual wall 1710.

Example 22—Example Search Method

Figure 18:
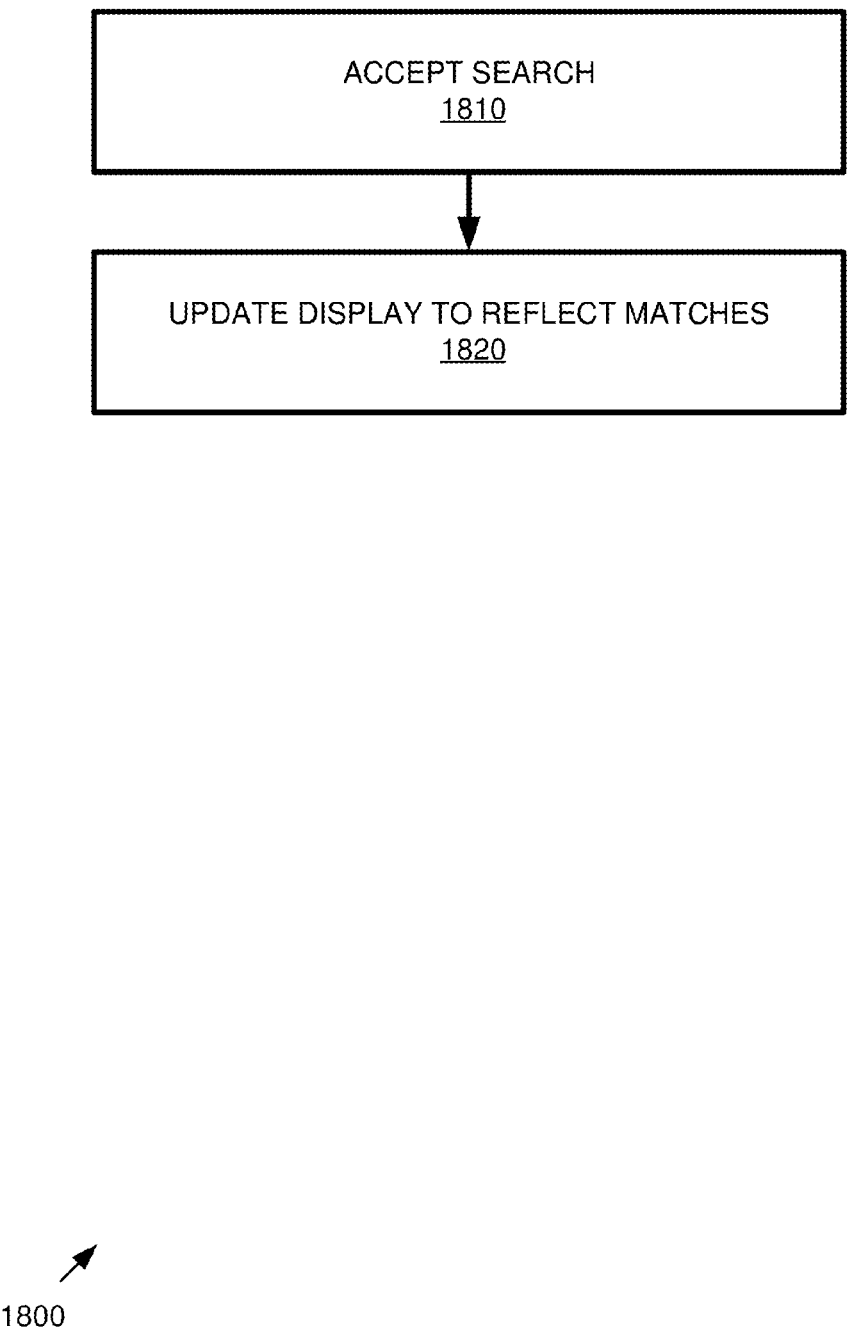
FIG. 18 is a flowchart of an example method of visual search for a virtual wall.

FIG. 18 is a flowchart of an example method 1800 of visual search for a virtual wall and can be used, for example, to implement the user interface shown in FIGS. 16 and 17.

At 1810, the search criteria are received as described herein.

At 1820, the display of the virtual wall (e.g., display attributes of the viewable items) is updated to reflect matches (e.g., those viewable items that meet the criteria are left unmodified, but those viewable items that do not meet the criteria disappear or are greyed out). In practice, the reverse can be implemented (e.g., viewable items that meet the criteria are specially depicted) (e.g., colored, highlighted, shadowed, or the like).

A character-by-character (e.g., letter-by-letter) updating search can be supported. The results are thus updated in response to receiving or deleting a character or letter in the search criteria. Such an approach can lead to faster arrival at search results because a new search need not be started from the user's perspective (e.g., the user does not need to start over).

The relationships described herein can be used in conjunction with searching. For example, groups can be searched for content, and the entire group(s) meeting specified criteria can be indicated as a search result. In this way, a pile or stack of related viewable items can be searched to see if content appears anywhere within it. If so, the group can be indicated as being within the search results.

Navigation within search results can be achieved in a variety of ways. For example, jumping to the previous/next item in the search results can be accomplished by clicking a button or using keyboard keys. Such a technique can also be used to create a link to a specific area on the virtual wall.

Example 23—Example Implementation with Minimap and Zoom

Figure 19:
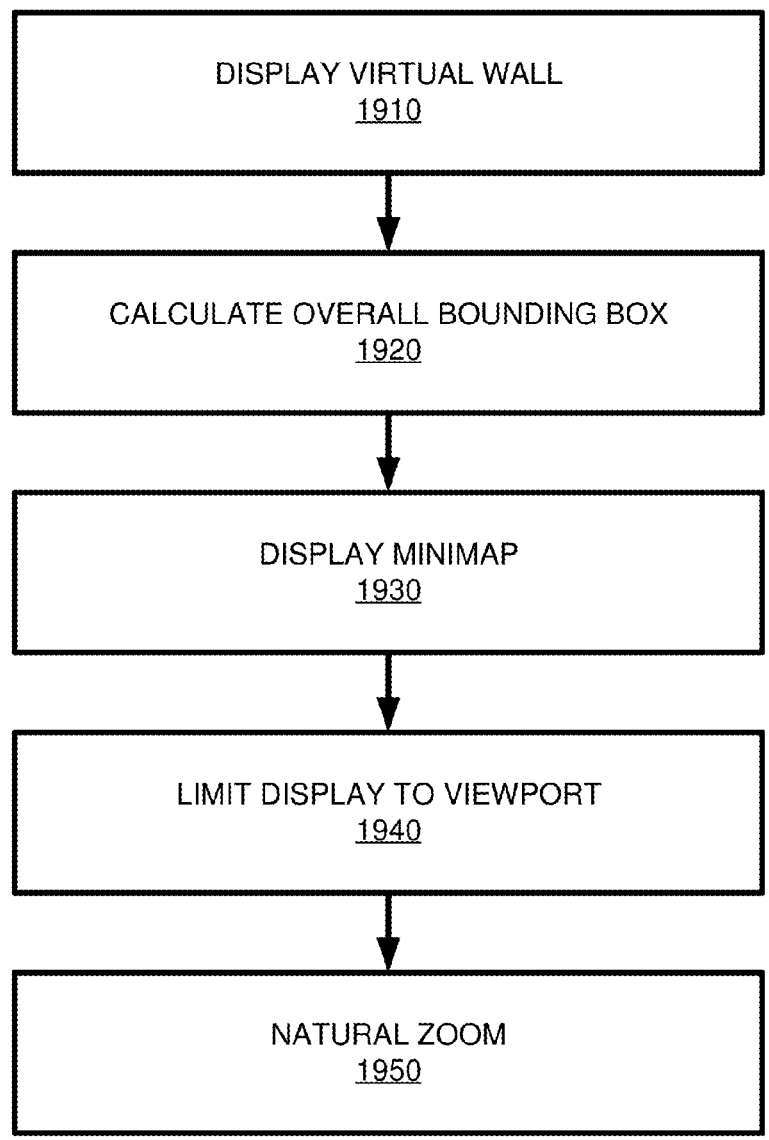
FIG. 19 is a flowchart of an example method of implementing a virtual wall.

Various combinations of the features described herein can be implemented to advantage. FIG. 19 is a flowchart of an example method 1900 of implementing a virtual wall.

At 1910 a web-based virtual wall comprising a plurality of viewable items of a plurality of viewable items types is displayed. As described herein, the web-based virtual wall can be based on HTML (e.g., HTML-based virtual wall). As described herein, the types can comprise a note type, a document type, a contact type, a multimedia type, or the like. The viewable items can overlap and have respective z positions on the virtual wall.

At 1920, an overall bounding box can be calculated for the entirety of the viewable items (e.g., to find a minimum and maximum X and Y).

Based on the overall bounding box, the extent of a minimap can be determined, and at 1930, the minimap can be displayed of the entirety of the plurality of viewable items of the virtual wall (e.g., the virtual wall covered by viewable items).

At 1940, display of the viewable items can be limited to those within a viewport that is within a sub-region of the entire virtual wall. In other words, some viewable items (or portions thereof) of the virtual wall are not visible on the user interface (e.g., because they are on the virtual wall but outside of the viewport).

At 1950, the viewport can be zoomed according to a natural zoom technique as described herein. Zooming can be in or out. The natural zoom technique can comprise the center-based zoom as described herein.

Example 24—Example Implementation with Zoom and Margin Properties

In any of the examples herein, a web-based mechanism can display content as a virtual wall (e.g., large data area) that can be zoomed and panned with JavaScript and Cascading Style Sheet (CSS) properties "zoom" and "margin." The area can hold an arbitrary amount of viewable items (sometimes called "data items"). The data area and data items can be positioned and rearranged by finger gestures and pointer devices and detect collisions. Zoom level and viewport is adapted by the user's screen size and the data, reacting to resize orientation change events (e.g., portrait to landscape). A minimap can show a preview of the data area.

The technologies can implement a flexible and scalable area for information and data representation in HTML using the CSS3 property "zoom" and "margin" in combination with computer graphics algorithms in JavaScript.

Example 25—Example Implementation Supporting Different Item Types

In any of the examples herein, a web-based mechanism can display a virtual wall (e.g., large data area) that can be zoomed, panned, positioned, and resized with JavaScript, HTML containers, and the CSS3 properties "zoom" and "margin." In some cases, "transform" (with scale) is used instead of "zoom." The area can hold an arbitrary amount of data items, such as Text, Graphics, and other multimedia objects. The data area itself and the data items can be spatially and visually positioned and rearranged by drag and drop and other user interactions such as finger gestures and pointer devices.

The items detect collisions with other items and calculate an appropriate depth when overlaying. The area's zoom level and viewport can be automatically determined by the screen size and the objects can be positioned on the area. The virtual wall can automatically react to resize changes and to orientation changes on a device. A minimap can show the data area with its items in a small overview as desired.

Example 26—Example Challenges Overcome

Traditional web pages have a document character and adapt the appearance and the amount of displayed content to the user's screen size. When the web browser opens such a document, it displays the top left part of the document first, considering this is the part of the page the user typically wants to read first. Scrolling and zooming features are also closely related to textual documents and focus on readability of the document.

Such an approach has its merits, but for graphical representation of information items and large amounts of data items, it can be easier to have a virtual area that is much bigger than the actual screen size and only move the viewport (e.g., the screen size of the web browser) across the virtual area and zoom or pan the area of current interest.

Modern browsers support a variety of scripting functionality and HTML as well as CSS3 standards. By default, the behavior of the browser is to display text and media documents, but by implementing viewport and positioning calculation logic inside the web page, the screen area inside the browser can be transformed to a virtual viewport as described above.

Example 27—Example Technical Solution

The technical solution can provide a visual area inside of a web browser that allows for holding and representing large amounts of information items (e.g., unstructured data) and data objects regardless of the screen size. The screen with its limited screen size is considered as the viewport of a virtually endless area. The viewport can be zoomed, panned, and positioned on the screen by simple interaction patterns so that the displayed information can be viewed as well as manipulated.

Similarly to a real-world pin board, the structuring and combining of data and information can be much more easily accomplished when items can just be moved around, pinned to a certain position, put in relation to other objects, clustered by semantics, and be looked at from an arbitrary distance. From a distance, one can get a better overview and recognize patterns in the data shown. From close up, one can see pieces of information that are otherwise hidden.

An implementation can use JavaScript, the jQuery framework, and SAPUI5 as the object framework for implementing controls. Such an implementation can be lightweight using such frameworks, but the solution can also be implemented in plain JavaScript without any of the frameworks as it can implement its own positioning and viewport algorithms and can use only the browser to render such items.

The following features can be implemented to give a very convincing effect of a virtual area that can be controlled and manipulated by user input intuitively.

Example 28—Example Feature: Data Area

In any of the examples herein, a data area can be defined as much larger than the actual screen size of a typical user. In contract to positioning with the CSS "left" and "top" attributes, the data area can be positioned with negative values for "margin-left" and "margin-top." For example, if the data area is 100,000 pixels by 100,000 pixels, it can be positioned with a negative margin of 50,000 pixels. Resolution-independent positioning can be achieved by converting the actual pixel values from the screen space to a virtual unit.

Such an approach can be leveraged when implementing a zoom feature so that it gives the impression of zooming in and out at the current viewport position (e.g., the center of the viewport) instead of scaling the data area. Also, the data area can thereby be vertically and horizontally centered in the beginning, which is more appropriate when presenting a virtual wall.

Example 29—Example Feature: Pan

In any of the examples herein, the viewport (which can correspond to the screen or parts of it) can be moved across the data area or panned by altering the margins of the data area. For example, if the user touches the data area with a pointer device (e.g., mouse, finger, gesture control, or the like) and moves into the direction one wants to see more information, the margins of the data area (e.g., as stored in the Document Object Model) can be modified in the opposite direction.

Example 30—Example Feature: Zoom

In any of the examples herein, a large area can be better viewed at different distances to get a better overview (zoom out) or to look at details (zoom in). Zooming can be implemented by the CSS3-Property "zoom," which scales down the viewport using numeric values less than 1 and increases the size of objects when using values greater than 1. Using the zoom property interactively with a slider or mouse wheel or pinch gesture on a mobile device gives a very realistic impression of zooming in and out.

Example 31—Example Feature: Positioning

In any of the examples herein, with the data area and the viewport defined, it is possible to add items to the data area. The data area and the items can be defined with the CSS attribute position=absolute. Because the items are defined inside the data area container and represented as a <div> element in HTML, they can just be positioned with the properties "left" and "top" inside the area.

For example, the virtual wall can be defined as a DIV element of class container, and the viewable items can be defined as DIV elements of class item within the container.

Such an approach can be helpful when storing the data area and its items in a storage system because its position can be saved and read again after transforming them from the resolution-dependent screen space to a virtual unit of measure.

Example 32—Example Feature: Viewport and Bounding Box

In any of the examples herein, the data area can be multiple times as large as the display screen (if viewed at a 1:1 scale), so a viewport can be automatically positioned on the data and the zoom level can be adjusted so that the entirety of items can be seen at once (e.g., when requested or when the device size and orientation changes). The viewport can be implemented via a bounding box technique that calculates the positions and sizes of data items added to the area. Then the outer dimensions of the bounding box that spans the items can be determined.

Given the bounding box of the viewable items, the viewport can be positioned on the bounding box so that the items in the box are displayed (e.g., can be seen in the viewable area). Therefore, the zoom level can be adjusted to either zoom in if the screen is larger than the bounding box or zoom out if the screen is smaller than the bounding box.

Automatic zooming can be applied when changing browser window, the dimensions of the data area change, or the device orientation is changed. It can also be triggered manually by user interaction.

Example 33—Example Feature: Collision Detection

In any of the examples herein, to determine if two objects (e.g., viewable items) are positioned closely or on top of each other, a collision detection mechanism can check whether the two object's bounding boxes are intersecting. Such an approach can be applied to the data items on the virtual wall. In an example, the inner bounding box of an item can be set to its size on the data, and an outer bounding box can be set with a threshold around the item.

The first bounding box can be used to calculate the actual collision of two items. An area can be implemented that does not allow overlapping of times when positioning and moving them on the data area. Another variant when a collision occurs is to allow for grouping of items. When one item collides with another, the user interface suggests opening a group containing both items.

The second bounding box can be used to calculate whether two objects are near each other, therefore, a threshold dependent on the zoom factor can be added to the actual size of the first bounding box to enlarge it into a second bounding box. When two objects are near, the user interface can show a variety of options: linking the objects to visually emphasize that the items relate, snap them together to allow easier layout, or connecting the objects so that they can only be moved together (e.g., until disconnected).

Example 34—Example Feature: Depth Calculation (Z-Index)

In any of the examples herein, when working with items on the data area, the items can overlap. The data area is actually a two-dimensional space, but with the features described herein and a layout supporting depth like shadows and transparency, it can give an impression of three dimensions. Therefore, a depth calculation can be used to position a data item on the appropriate depth value. When an item is manipulated, it can be assigned a depth value that is closest to the user's screen or viewport, so that it is not covered by other items (e.g., it is brought to the front). The values can be implemented via the CSS-property "z-index."

Example 35—Example Feature: Canvas-Based Minimap

In any of the examples herein, if many data items populate the data area, an overview can be helpful even when zooming out to a more distant view of the data area. A minimap can be used. The HTML5 canvas element can be used that shows an overview of the data area regardless of the current zoom level.

On the minimap, the bounding box and a preview of the entirety of items of the data area can be rendered so that the entirety of data items can be seen. This way, the user can quickly see how many data items are on the data area and where the viewport is currently located on the data area. The minimap can be configured to appear only if there are items currently not visible within the viewport or when the bounding box of the items becomes larger than the currently calculated viewport.

Example 36—Example Sharing

In any of the examples herein, the virtual wall can be shared among a plurality of users. A user interface can be provided whereby access control can be accomplished.

Internally, a command is received to share the virtual wall with another user identifier (e.g., user, group, or the like). And, responsive to the command, the virtual wall is shared with the other user identifier.

Sharing can be implemented to allow editing of content simultaneously on separate devices.

Example 37—Example Advantages

Web pages have taken many approaches to display content responsive to the user's device and screen size, typically by hiding details or shrinking the width and height. However, an opposite approach can provide a viewport to the data that can be repositioned and zoomed on content that is much larger than the screen size.

Example 38—Example Computing Systems

Figure 20:
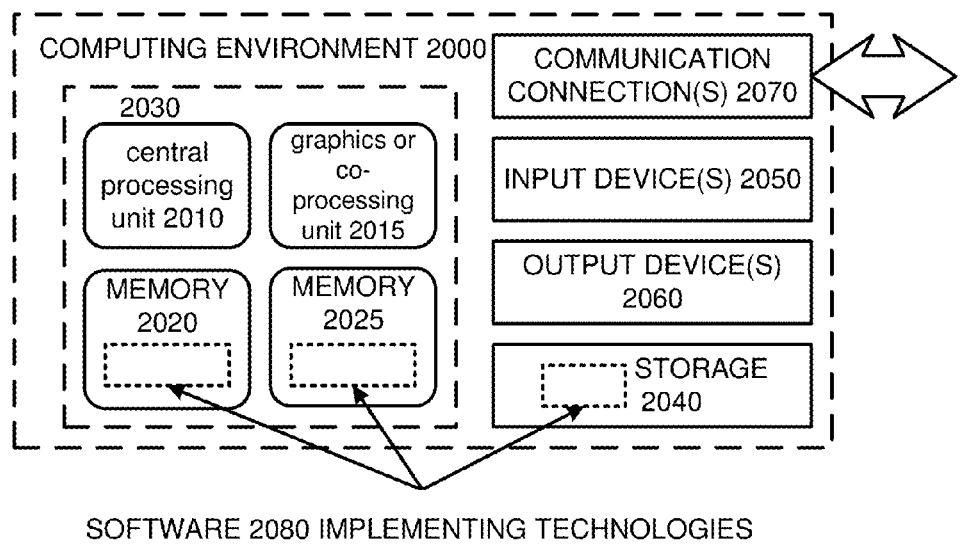
FIG. 20 is a diagram of an example computing system in which described embodiments can be implemented.

FIG. 20 illustrates a generalized example of a suitable computing system 2000 in which several of the described innovations may be implemented. The computing system 2000 is not intended to suggest any limitation as to scope of use or functionality, as the innovations may be implemented in diverse general-purpose or special-purpose computing systems.

With reference to FIG. 20, the computing system 2000 includes one or more processing units 2010, 2015 and memory 2020, 2025. In FIG. 20, this basic configuration 2030 is included within a dashed line. The processing units 2010, 2015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 20 shows a central processing unit 2010 as well as a graphics processing unit or co-processing unit 2015. The tangible memory 2020, 2025 may be volatile memory (e.g., registers, cache, RAM), non-volatile memory (e.g., ROM, EEPROM, flash memory, etc.), or some combination of the two, accessible by the processing unit(s). The memory 2020, 2025 stores software 2080 implementing one or more innovations described herein, in the form of computer-executable instructions suitable for execution by the processing unit(s).

A computing system may have additional features. For example, the computing system 2000 includes storage 2040, one or more input devices 2050, one or more output devices 2060, and one or more communication connections 2070. An interconnection mechanism (not shown) such as a bus, controller, or network interconnects the components of the computing system 2000. Typically, operating system software (not shown) provides an operating environment for other software executing in the computing system 2000, and coordinates activities of the components of the computing system 2000.

The tangible storage 2040 may be removable or non-removable, and includes magnetic disks, magnetic tapes or cassettes, CD-ROMs, DVDs, or any other medium which can be used to store information in a non-transitory way and which can be accessed within the computing system 2000. The storage 2040 stores instructions for the software 2080 implementing one or more innovations described herein. The storage 2040 does not include signals per se.

The input device(s) 2050 may be a touch input device such as a keyboard, mouse, pen, or trackball, a voice input device, a scanning device, or another device that provides input to the computing system 2000. For video encoding, the input device(s) 2050 may be a camera, video card, TV tuner card, or similar device that accepts video input in analog or digital form, or a CD-ROM or CD-RW that reads video samples into the computing system 2000. The output device(s) 2060 may be a display, printer, speaker, CD-writer, or another device that provides output from the computing system 2000.

The communication connection(s) 2070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 39—Example Cloud-Supported Environment

Figure 21:
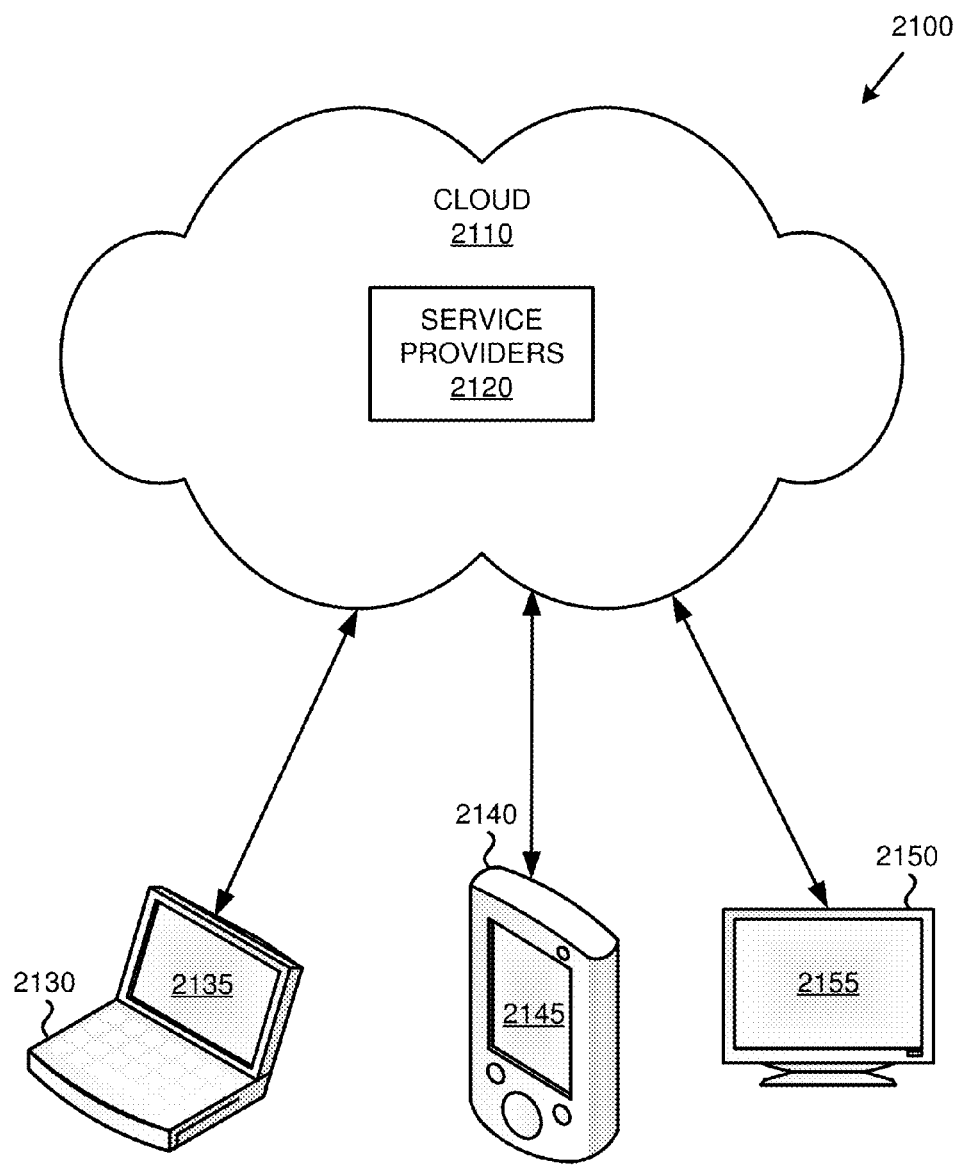
FIG. 21 is an example cloud-support environment that can be used in conjunction with the technologies described herein.

In example environment 2100 of FIG. 21, the cloud 2110 provides services for connected devices 2130, 2140, 2150 with a variety of screen capabilities. Connected device 2130 represents a device with a computer screen 2135 (e.g., a mid-size screen). For example, connected device 2130 could be a personal computer such as desktop computer, laptop, notebook, netbook, or the like. The connected device 2140 represents a device with a mobile device screen 2145 (e.g., a small size screen). For example, the connected device 2140 could be a mobile phone, smart phone, personal digital assistant, tablet computer, and the like. The connected device 2150 represents a device with a large screen 2155. For example, the connected device 2150 could be a television screen (e.g., a smart television) or another device connected to a television (e.g., a set-top box or gaming console) or the like. One or more of the connected devices 2130, 2140, 2150 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 2100. For example, the cloud 2110 can provide services for one or more computers (e.g., server computers) without displays.

Services can be provided by the cloud 2110 through service providers 2120, or through other providers of online services (not depicted). For example, cloud services can be customized to the screen size, display capability, and/or touch screen capability of a particular connected device (e.g., connected devices 2130, 2140, 2150).

In example environment 2100, the cloud 2110 provides the technologies and solutions described herein to the various connected devices 2130, 2140, 2150 using, at least in part, the service providers 2120. For example, the service providers 2120 can provide a centralized solution for various cloud-based services. The service providers 2120 can manage service subscriptions for users and/or devices (e.g., for the connected devices 2130, 2140, 2150 and/or their respective users).

Example 40—Computer-Readable Media

Any of the computer-readable media herein can be non-transitory (e.g., volatile memory such as DRAM or SRAM, nonvolatile memory such as magnetic storage, optical storage, or the like) and/or tangible. None of the computer-readable media herein include signals per se. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 41—Example Advantages

The technologies described herein can provide automatic generation of custom reports without the need to understand how the reports are compiled. A user can request via email a specific report type, along with report parameters, and receive the report within a short time (e.g. within minutes or seconds, or nearly instantly).

Another advantage of the described technologies is that report generation speed can be increased by limiting the number of reports available to an authorized sender based on the identity of the sender. Furthermore, the reduced set of reports can decrease the bandwidth required to retrieve reports from a BI data repository.

ALTERNATIVES

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. All that comes within the scope and spirit of the claims is therefore claimed as the invention.

What is claimed is:
1. A system comprising:
one or more hardware processors;
one or more computer-readable media coupled to the one or more hardware processors;
a stored representation of a virtual wall comprising a plurality of viewable items posted on the virtual wall, wherein the viewable items have a z dimension and can overlap;
a viewport defining a spatial sub-area of the virtual wall that is currently presented; and
a display manager configured to manage the viewport and the stored representation of the virtual wall for presentation in a web-based user interface
wherein:
the stored representation of the virtual wall comprises a Document Object Model;
the viewable items are implemented as elements within the Document Object Model; and
the viewport is implemented via a cascading style sheet zoom property and cascading style sheet margin properties.

2. The system of claim 1 further comprising:
one or more stored relationships of the plurality of viewable items; and a collision engine configured to calculate when a first bounding box of a first viewable item intersects a second bounding box of a second viewable item and further configured to update the stored relationships to reflect a relationship between the first viewable item and the second viewable item responsive to detecting intersection.

3. The system of claim 2 wherein:
the collision engine supports a plurality of bounding boxes of differing sizes for a single item; and
the collision engine computes a collision type indicating on which of the plurality of bounding boxes a collision is based.

4. The system of claim 3 wherein:
the plurality of bounding boxes comprise an inner bounding box and an outer bounding box.

5. The system of claim 1 wherein:
the display manager is configured to calculate a bounding box for a given plurality of the viewable items out of the plurality of viewable items.

6. The system of claim 5 wherein:
the display manager is configured to calculate an overall bounding box for an entirety of the viewable items on the virtual wall and generate a minimap of the virtual wall based on the overall bounding box.

7. The system of claim 1 further comprising:
a zoom engine configured to enlarge or shrink the viewport and simultaneously apply a center-based zoom effect to the spatial sub-area of the virtual wall that is currently presented in the viewport.

8. The system of claim 7 wherein:
the zoom engine applies negative values to the cascading style sheet margin properties.

9. A method implemented at least in part by a computing system, the method comprising:
for a plurality of viewable items on a virtual wall, maintaining a viewport area that covers less than an entirety of the virtual wall, wherein the viewable items have a z dimension and can overlap;
in a web-based user interface, displaying a portion of the virtual wall corresponding to the viewport area; and
in the web-based user interface, zooming the viewport area according to a center-based zoom technique, wherein the zooming comprises detecting events directed to a native zoom function of a browser and implementing the center-based zoom technique as a custom zoom in place of the native zoom function, wherein the native zoom function zooms relative to an upper left corner of the viewport area;
wherein the viewport area is implemented via a cascading style sheet zoom property and cascading style sheet margin properties.

10. The method of claim 9 wherein zooming the viewport area comprises:
positioning the virtual wall relative to the viewport area, wherein positioning comprises setting the cascading style sheet margin properties to negative values.

11. The method of claim 10 further comprising:
calculating the negative values as additive inverses of coordinates in a middle of the viewport area.

12. The method of claim 9 further comprising:
receiving a command to share the virtual wall with another user identifier; and
responsive to the command, sharing the virtual wall with the other user identifier.

13. The method of claim 9 further comprising:
processing movement of a given viewable item on the virtual wall;
detecting a near collision between the given viewable item and another viewable item; and
responsive to detecting the near collision, storing a relationship between the given viewable item and the other viewable item.

14. The method of claim 13 wherein:
storing the relationship comprises snapping the given viewable item and the other viewable item together.

15. The method of claim 13 wherein:
storing the relationship comprises connecting the given viewable item and the other viewable item together.

16. One or more non-transitory computer-readable media comprising computer-executable instructions that when executed cause a computing system to perform a method comprising:
for a plurality of viewable items on a virtual wall, maintaining a viewport area that covers less than an entirety of the virtual wall, wherein the viewable items have a z dimension and can overlap;
in a web-based user interface, displaying a portion of the virtual wall corresponding to the viewport area; and
in the web-based user interface, zooming the viewport area according to a center-based zoom technique, wherein the zooming comprises detecting events directed to a native zoom function of a browser and implementing the center-based zoom technique as a custom zoom in place of the native zoom function, wherein the native zoom function zooms relative to an upper left corner of the viewport area;
wherein the viewport area is implemented via a cascading style sheet zoom property and cascading style sheet margin properties.

17. One or more non-transitory computer-readable media comprising computer-executable instructions that when executed cause a computing system to perform a method comprising:
displaying an HTML-based virtual wall comprising a plurality of viewable items of a plurality of viewable item types comprising a note type, a document type, a contact type, and a multimedia type, wherein the plurality of viewable items can overlap and have respective z positions on the HTML-based virtual wall;
calculating an overall bounding box for the plurality of viewable items;
based on the overall bounding box, displaying a minimap of an entirety of the plurality of viewable items of the HTML-based virtual wall;
limiting display of the viewable items to those appearing within a viewport that is a sub-region of an entirety of the HTML-based virtual wall;
zooming the viewport according to a center-based zoom technique, wherein the viewport is implemented via a cascading style sheet zoom property and cascading style sheet margin properties;
receiving search criteria; and
disappearing or greying out displayed viewable items that do not meet the search criteria while leaving the displayed viewable items that do meet the search criteria in place.

\* \* \* \* \*